United States Patent
Baird et al.

(10) Patent No.: US 8,584,082 B2
(45) Date of Patent: Nov. 12, 2013

(54) SYSTEM FOR DYNAMIC DISCOVERY, CONFIGURATION, AND DEVELOPMENT OF PROCESS-BOUND WIDGETS

(75) Inventors: Kerstin Baird, Portland, OR (US); Ali Kheirolomoom, Pleasanton, CA (US)

(73) Assignee: Serena Software, Inc., Redwood City, CA (US)

( * ) Notice: Subject to any disclaimer, the term of this patent is extended or adjusted under 35 U.S.C. 154(b) by 975 days.

(21) Appl. No.: 12/483,177

(22) Filed: Jun. 11, 2009

(65) Prior Publication Data

US 2009/0313601 A1   Dec. 17, 2009

Related U.S. Application Data

(60) Provisional application No. 61/061,060, filed on Jun. 12, 2008.

(51) Int. Cl.
*G06F 9/44* (2006.01)

(52) U.S. Cl.
USPC ........... 717/105; 717/104; 717/109; 717/113; 717/106; 717/110; 715/762; 715/763; 715/769

(58) Field of Classification Search
USPC .......... 717/110–113, 104–106; 715/762–763, 715/769
See application file for complete search history.

(56) References Cited

U.S. PATENT DOCUMENTS

| | | | | |
|---|---|---|---|---|
| 7,954,115 B2* | 5/2011 | Gisolfi | ........................... | 719/320 |
| 2006/0235548 A1* | 10/2006 | Gaudette | ........................ | 700/83 |
| 2007/0006136 A1* | 1/2007 | Hirschberg et al. | ........... | 717/105 |
| 2007/0130541 A1* | 6/2007 | Louch et al. | .................. | 715/804 |
| 2007/0260612 A1* | 11/2007 | Papakonstantinou et al. | .. | 707/10 |
| 2007/0266329 A1* | 11/2007 | Gaudette | ........................ | 715/763 |
| 2008/0140702 A1* | 6/2008 | Reed et al. | ..................... | 707/102 |
| 2008/0155440 A1* | 6/2008 | Trevor et al. | .................. | 715/769 |
| 2008/0222599 A1* | 9/2008 | Nathan et al. | ................. | 717/107 |
| 2008/0229280 A1* | 9/2008 | Stienhans | ..................... | 717/107 |

(Continued)

OTHER PUBLICATIONS

Mobile Widget Architecture, Lars Vising, Nov. 2008.*

(Continued)

*Primary Examiner* — Lewis A Bullock, Jr.
*Assistant Examiner* — Tina Huynh
(74) *Attorney, Agent, or Firm* — Hickman Palermo Truong Becker Bingham Wong LLP

(57) ABSTRACT

Techniques are provided for designing a mashup. In an example embodiment, a user input is detected. The user input relates a first GUI object, which represents a first widget, to a second GUI object that represents a second widget. The first widget conforms to a first widget specification and the second widget conforms to a second widget specification that is different than the first widget specification. In response to the user input, a variable is defined, where, at run-time, a value of an output parameter of the first widget is assigned to the variable and the variable is used as an input parameter of the second widget. An event definition that defines an event is generated based on the user input, where the event, when detected at run-time, causes contents of at least one of the first widget and the second widget to be refreshed. A binding definition is stored, where the binding definition associates with each other the event definition, the variable, the output parameter of the first widget, and the input parameter of the second widget. A definition of the mashup, which includes the binding definition, is then generated.

20 Claims, 12 Drawing Sheets

(56) References Cited

U.S. PATENT DOCUMENTS

| | | | |
|---|---|---|---|
| 2009/0070409 A1* | 3/2009 | Clayton et al. | 709/203 |
| 2009/0083697 A1* | 3/2009 | Zhang et al. | 717/105 |
| 2009/0199077 A1* | 8/2009 | Sar et al. | 715/201 |
| 2009/0248883 A1* | 10/2009 | Suryanarayana et al. | 709/229 |

OTHER PUBLICATIONS

An Open Source Development Framework in Support of Cartographic Integration, Pulsifer et al., Feb. 2008.*

Abdelnur et al., "Portlet Specification, Version 1.0", JSR-168, Sun Microsystems, Inc. and IBM Corporation, Jul. 9, 2003, 135 pages.

* cited by examiner

FIG. 2E

SYSTEM FOR DYNAMIC DISCOVERY, CONFIGURATION, AND DEVELOPMENT OF PROCESS-BOUND WIDGETS

PRIORITY CLAIM

This application claims priority under 35 U.S.C. §119(e) to U.S. Provisional Patent Application Ser. No. 61/061,060, entitled "SYSTEM FOR DYNAMIC DISCOVERY, CONFIGURATION, AND DEPLOYMENT OF PROCESS-BOUND WIDGETS", filed by Kerstin Baird et al. on Jun. 12, 2008, the entire content of which is hereby incorporated by reference for all purposes as if fully set forth herein.

FIELD OF THE INVENTION

This invention relates generally to software development.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In some aspects of software development, widgets may be used for building user interfaces, web pages, and other software products such as mashups. A widget is a self-contained and reusable software element. For example, a widget may be inserted within a web page to provide a particular functionality or content either directly (by virtue of a direct rendering by a web browser) or by accessing and retrieving information over a network. In another example, a widget may be used in building mashups. A mashup is a composite application that is operable to integrate and present data and functionalities that are provided by various different sources.

While mashups may allow for using data and functionalities of widgets, designing and developing mashups that integrate different types of widgets has proved to be very difficult. This is because the existing approaches for rendering widgets at run-time require widgets to comply with certain standards (e.g., input/output specifications, interfaces, methods, data definition formats, etc.) in order to ensure widget interoperability. In practice, however, there is no one commonly accepted standard to which widgets are written to conform, and one can find in various repositories a large number of widgets that conform to numerous specifications and an even larger number of widgets that do not conform to any standard, specification, or definition at all. For example, various widget sources, such as Google, Silverlight, and Adobe, all have their own standard or specification for widget rendering. Because widgets are relatively easy to develop, it is practically impossible to impose one common standard for widget rendering. As a result, the existing approaches for widget rendering are very limited in the level of widget interoperability they can achieve.

The above shortcomings of the existing approaches for widget rendering have a direct limiting effect on the existing approaches for developing mashups. One disadvantage of these approaches for developing mashups is that they require technically sophisticated users, such as software developers, to design and develop mashups that include widgets conforming to different standards and/or specifications. Because widgets that conform to different standards and/or specifications typically have different types of input/output interfaces, data formats, etc., only software developers are able to negotiate the intricate technical details necessary to achieve interoperability between such disparate widgets in a mashup. However, while fairly unsophisticated software users (e.g., business users) are generally well-suited to design and develop mashups by using drag-and-drop development tools, such unsophisticated software users are unlikely to have the technical knowledge required by the existing mashup development approaches in order to successfully integrate into a mashup disparate widgets that conform to different standards and/or specifications.

BRIEF DESCRIPTION OF THE DRAWINGS

In the figures of the accompanying drawings like reference numerals refer to similar elements.

FIG. 2E is a block diagram that illustrates an example mashup design application operable to present a run-time mashup preview of a widget according to an example embodiment.

DETAILED DESCRIPTION

Figure 1:
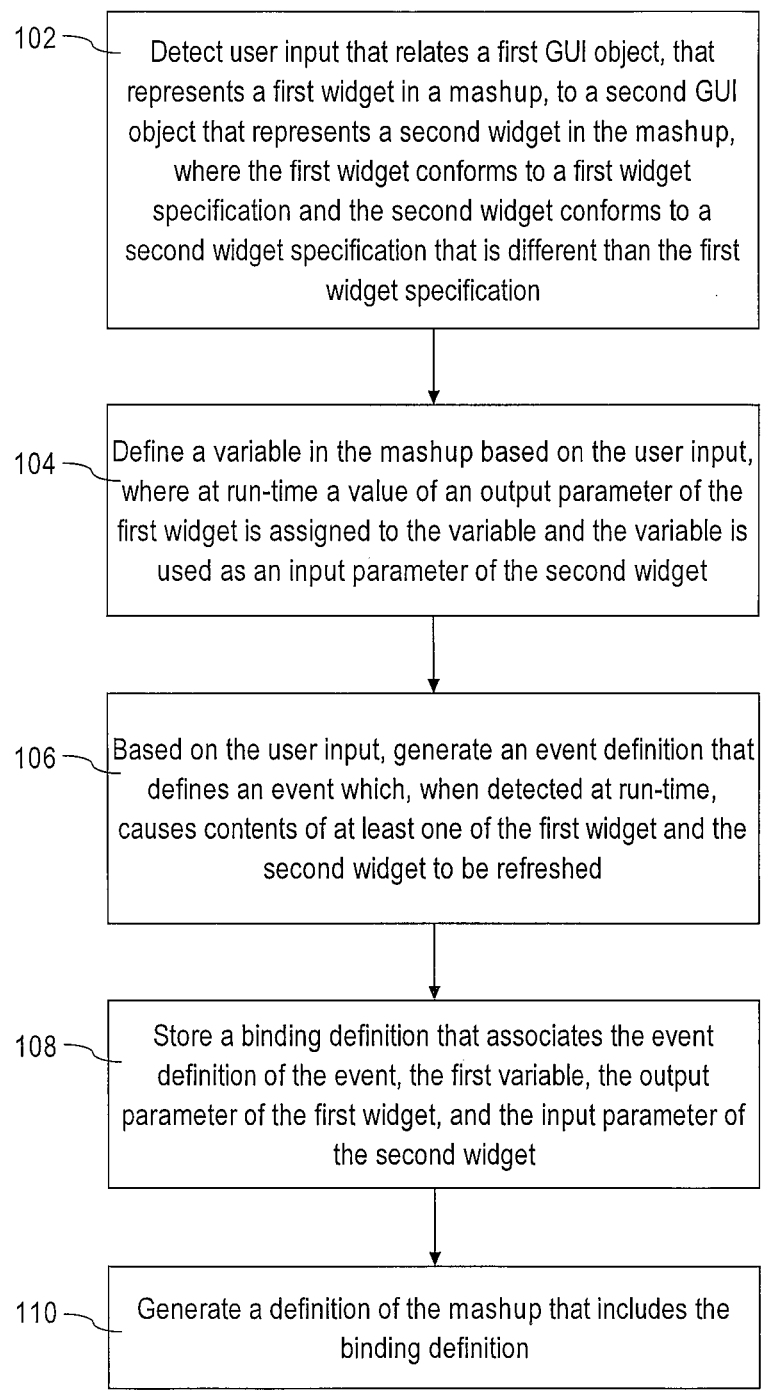
FIG. 1 is a flow diagram that illustrates a method for designing mashups according to an example embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscur ing the present invention. Various aspects of the invention are described hereinafter in the following sections:

I. OVERVIEW
    II. FUNCTIONAL DESCRIPTION OF AN EXAMPLE EMBODIMENT
    III. EXAMPLE EMBODIMENT IN A COMPUTER PROGRAM PRODUCT
    IV. EXAMPLE DESIGN AND EXECUTION ENVIRONMENT
    V. DESIGN-TIME BINDING OF WIDGET PARAMETERS
    VI. WIDGET EVENTING
    VII. AUTOMATIC WIDGET DISCOVERY
    VIII. AUTOMATIC GENERATION OF CONFIGURATION INTERFACES
    IX. EXAMPLES OF WIDGET INTEGRATION AND INTEROPERATION
    X. IMPLEMENTATION MECHANISMS

I. Overview

Techniques are described herein for designing mashups. Rather than requiring compliance to a certain standard or widget specification, the techniques described herein allow for automatic discovery, configuration, and binding of widgets that are provided by various different sources and that conform to various different widget specifications and types. The techniques described herein do not impose any practical limitations on the widgets' specifications, types, and sources as a condition for run-time widget interoperability in a mashup. The techniques described herein provide mechanisms that allow widgets to be consumed regardless of the widgets' origins, designs, or underlying technologies. For example, embodiments of the techniques described herein allow users to drag-and-drop into mashup applications widgets from different sources (e.g., Google, Flash, Adobe, etc.) while at the same time ensuring that at run-time the widgets will be able to automatically exchange data and pass to each other various data values and arguments.

The techniques described herein provide a binding mechanism to discover the input and output parameters of widgets and to bind the widget parameters to data and context variables in a mashup. The techniques described herein also provide an eventing mechanism to drive a dynamic rules-driven refresh of the widgets' content based upon detection during run-time of data changes in the bound widgets' input parameters. Thus, the techniques described herein achieve automatic widget interoperability by providing at design-time for binding the input/output parameters of the widgets to data and context variables in the mashup, rather than by requiring the widgets to exchange information directly in accordance with a pre-determined standard or protocol. By providing for configuring and storing event definitions at design-time, the techniques described herein provide for the designing of a mashup that is operable at run-time to fully control and modify the behavior of its widgets as desired and to update the widgets' contents based on the occurrence of the defined events.

In an example embodiment, user input is detected in the design-time phase of a mashup. The user input relates a first Graphical User Interface (GUI) object, which represents a first widget, to a second GUI object that represents a second widget, where the first widget and the second widget are to be rendered in the mashup at run-time. The first widget conforms to a first widget specification and the second widget conforms to a second widget specification that is different than the first widget specification. In response to the user input, a variable is automatically defined in the mashup based on the user input. The variable is such that, at run-time, a value of an output parameter of the first widget is assigned to the variable and the variable is used as an input parameter of the second widget. Based on the user input, an event definition that defines an event is generated. The event is such that, when detected at run-time, the event causes contents of at least one of the first widget and the second widget to be refreshed. A binding definition is generated and stored. The binding definition associates the event definition of the event, the variable, the output parameter of the first widget, and the input parameter of the second widget. A definition of the mashup is also generated and stored, where the definition of the mashup includes the binding definition.

In some embodiments, the techniques described herein may be implemented in a mashup design application that may be executed by one or more computing devices. In these embodiments, according to the techniques described herein the mashup design application completely hides the widget binding and eventing mechanisms from a user that is designing a mashup. For example, a visual configuration layer in the mashup design application allows the user to drag-and-drop GUI objects that represent widgets and other mashup components, but hides from the user the complexity that is going on underneath to integrate the widgets and the mashup components. Any code and other software elements, which may be needed to provide the integration and interoperation functionalities of the widgets, are generated automatically by the mashup design application. In this manner, according to the techniques described herein the widget integration and interoperation is provided transparently to the user that is designing and developing the mashup, without the user being aware at all that the used widgets may be conforming to a variety of different standards, specifications, or technologies. This allows technologically unsophisticated users, such as business users, to design mashups without having the technical knowledge necessary for integrating and making interoperable widgets that may conform to different widget specifications.

It is noted that the techniques described herein may be implemented in various embodiments. Examples of such embodiments include, but are not limited to, one or more computer-implemented methods that are executed by one or more computing devices, one or more integral or distributed computer systems configured and operable to provide the techniques described herein, and one or more computer-readable storage media that store sequences of instructions that can be executed by one or more processors.

II. Functional Description of an Example Embodiment

FIG. 1 is a flow diagram that illustrates an example method for designing mashups according to the techniques described herein. The techniques described herein may be implemented by a variety of software and/or hardware components and in a variety of operational contexts at "design-time", which is the time when a mashup is being designed and developed by a user. For example, in some operational contexts, the steps of the method in FIG. 1 may be performed by a mashup design application that is executed by one or more computing devices. As used herein, "mashup design application" refers to a set of instructions which, when executed by one or more processors in one or more computing devices, is operable to provide the techniques described herein for designing mashups. Thus, for illustration purposes only, the steps of the method in FIG. 1 are described hereinafter as being performed by a mashup design application that is executed by one or more computing devices. It is noted, however, that in various embodiments and operational contexts the steps of the method in FIG. 1 may be performed by software and/or hardware components other than a mashup design application.

Referring to FIG. 1, in step 102 a mashup design application detects user input that is provided by a user that is designing a mashup. The user input relates a first GUI object, which represents a first widget, to a second GUI object that represents a second widget, where the first widget conforms to a first widget specification and the second widget conforms to a second widget specification that is different than the first widget specification. The first widget and the second widget are included in the mashup and are to be rendered in the mashup at "run-time", which is the time when the mashup is executed to produce the content, data, and/or functionalities intended by the user(s) that designed the mashup.

As used herein, "mashup" refers to a composite software application that is operable to integrate and present functionalities and data that are provided by various different sources. Different types of mashups include, without limitation, presentation mashups, data mashups, and business mashups. A presentation mashup is operable to integrate data from one or more external services, such as web services, and to present the integrated data to a user in a graphical user interface. An example of a presentation mashup is a mashup that is operable to combine real estate listings provided by a home listing service with the corresponding map locations provided by a map service. A data mashup is typically operable to combine and integrate data of similar types that are provided by multiple different services. An example of a data mashup is a mashup that is operable to combine the data from multiple RSS feeds into a single feed. A business mashup is operable to combine and present data from one or more external services and to integrate the data with specific program logic. An example of a business mashup is a mashup operable to integrate product prices received from one or more web services with a graphical user interface that allows a business manager to approve or reject a discount off the prices for certain products.

As used herein, "widget" refers to a self-contained and reusable software element. A widget may be implemented as a portable set of code that can be installed, inserted, or embedded in a web page and executed by a web browser without requiring any additional compilation. For example, a widget can be a set of Hyper-Text Markup Language (HTML) code that is embedded within a web page that provides dynamic content. In another example, a widget may be a Uniform Resource Locator (URL) or a service call to a web service that is embeddable into a web page; when a web browser renders the web page, the URL or the service call may be executed and the returned content may be rendered by the web browser along with or into the web page. In another example, a widget may be a set of HTML code that includes API calls to a particular widget source (e.g., a service provider of Google gadgets or Adobe widgets). In various operational contexts, a widget may be implemented as a self-contained GUI element that is not bound to any static data and is configured to provide a particular functionality or content either directly (by virtue of a direct rendering by a web browser) or by accessing and retrieving information over a network. From the user perspective, widgets typically are transparent because after a widget is inserted into a web page or a GUI form, the functionality and/or content of the widget is rendered automatically and without any additional compilation by the rendering application (e.g., a web browser).

As used herein, "widget specification" refers to a set of data that describes, specifies, and/or otherwise defines rules or standards that govern the input/output interfaces, parameters, events, procedures, methods, Application Programming Interfaces (APIs), and various other properties that a widget must have, possess, and/or implement in order to be rendered at run-time by a rendering application. One of the more popular widget specifications is JSR-168, which defines mechanisms and APIs for rendering a widget—e.g., the actions that the widget can respond to, the data that the widget can broadcast, etc. Past approaches require that every widget included in an application, portal, or a web page must conform to a certain specification, and conforming to the specification requires the widget to include the methods that implement the interfaces, events, and procedures defined by the specification. In this way the past approaches ensure that all widgets, which are combined in an application, portal, or a web page, implement the same common input/output interfaces and methods, and therefore can be interoperatively rendered at run-time.

It is noted that, in contrast to the past approaches, the techniques described herein do not require conformance to a common widget specification, or conformance to any widget specification at all, in order to provide integration and interoperability among the widgets in a mashup during run-time when the widgets are rendered. For example, with reference to step 102 in FIG. 1, a user who is designing a mashup with the mashup design application may provide input (e.g., a GUI object such as a line, arrow, or other visual symbol) that relates a first widget to a second widget, without the user needing to know or even being aware that the two widgets conform to different widget specifications (or to no widget specifications at all, for that matter).

Referring to FIG. 1, in step 104 the mashup design application automatically defines a variable in the mashup based on the user input. The variable is such that, during run-time when the mashup is executed, a value of an output parameter of the first widget is assigned to the variable and the variable is used as an input parameter of the second widget. As used herein, "variable" refers to a name identifier that is associated with a value, where the value may be assigned and changed through a reference to the name identifier. At run-time, a variable is usually bound to a specific location in dynamic memory or persistent storage where the value of the variable is stored or to be stored. Depending on the programming language in which a variable is defined, a variable may be associated with a datatype and may be associated with more than one value—e.g., a single variable may be associated with multiple values that are stored in various logical structures such as, for example, an array, a collection, a set, a list, a queue, etc. In some embodiments, the mashup design application may also automatically generate code that may be needed to facilitate the assignment to the variable of the value of the output parameter of the first widget and the passing of the variable as the input parameter of the second widget. As used herein, "input" parameter refers to data which is passed to a widget and based on which the widget generates a particular content or renders a particular functionality; "output" parameter refers to data which is returned by a widget as a particular result, content, and/or a particular functionality of the widget.

According to the techniques described herein, "automatically" defining a variable means that a software entity (e.g., a mashup design application or a computer process) defines or declares a variable without receiving any user input that expressly declares that variable. For example, for the purpose of ensuring run-time interoperability between two widgets, a mashup design application may declare the variable "vZip" without receiving any statement from the user that expressly defines the variable, assigns value(s) to the variable, or passes the variable as parameters to functions, routines, or methods—that is, without receiving user statements such as "char*vZip", "char vZip[5]", "char[ ] vZip", "int vZip", "char vZip='95110'", "int vZip=95110", "foo(vZip)", etc. In some embodiments, a mashup design application may automatically define in a mashup any GUI object that can be assigned values at run-time, where the GUI object may be used as a variable to dynamically bind an output parameter of one widget to the input parameter of another widget. Examples of such GUI objects include, but are not limited to, a text field, a list box, a drop-down box, a button, and any other visible or hidden controls or fields in GUI forms or frames that can be assigned values at run-time.

Referring to FIG. 1, in step 106 the mashup design application automatically generates, based on the user input, an event definition that defines an event in the mashup. The event is such that, when it is detected at run-time when the mashup is executed, the event causes the contents of the first and/or second widget to be refreshed. In some embodiments, the mashup design application may also automatically generate code that may be needed to facilitate the detection of the event defined in the event definition. As used herein, "event" refers to a set of data that is generated at run-time in response to the completion or occurrence of a particular activity, and "raising" an event refers to generating and emitting the set of data representing the event. "Event definition" refers to a set of metadata information that defines an event; an event definition may be stored in the form of a data structure including, but not limited to, a record in a table or file, a data object stored in memory, and any other suitable type of structured storage.

Referring to FIG. 1, in step 108 the mashup design application generates a binding definition that associates with each other the event definition of the event, the variable, the output parameter of the first widget, and the input parameter of second widget. In some embodiments, according to the techniques described herein a binding definition may be used at the time a mashup is deployed to automatically generate any code or other software entities (e.g., records, references, etc.) that implement the widget interoperability and eventing intended by the user that is designing the mashup. In some embodiments, according to the techniques described herein a binding definition may be used to dynamically determine how to process events that are raised during the run-time of a mashup and how to process and pass data among the various widgets included in the mashup.

Referring to FIG. 1, in step 110 the mashup design application generates and stores a definition of the mashup, where the definition of the mashup includes the binding definition. The mashup definition is a set of data that includes the information that is needed to deploy and execute the mashup including, but not limited to, the code for any forms and GUIs included in the mashup, the code for any widgets and other components included in the mashup, any event definitions and binding definitions for events and bound variables in the mashup, and any information regarding the run-time execution environment where the mashup is to be executed.

A mashup definition may be implemented as a set of data in various formats. For example, in some embodiments a mashup definition may be implemented as a set of files in an extensible markup language (XML) format. In some embodiments, a mashup definition may be implemented as one or more data objects that are stored in one or more repositories such as a directory. In some embodiments, a mashup definition may be implemented as one or more data records in one or more files or databases. Thus, the techniques described herein for designing mashups are not limited to any particular type or format in which mashup definitions of mashups are generated and stored.

According to the techniques described herein, in some embodiments a mashup design application is used to design a mashup that includes one or more widgets that are bound to content variables in the mashup. After the design of the mashup is completed, the mashup design application is operable to parse the mashup and to create an XML-based definition that describes, expresses, and represents (among other mashup components) any widgets that are used in the mashup and any bindings between content variables and widget parameters. For example, an XML-based definition may be a properly formatted XML file that, among other things, describes which input and/or output parameters of which widgets are bound to which content variables. The XML-based definition of a mashup may be used to deploy and install a mashup at a mashup server that is operable to execute the mashup and to provide the functionality of the mashup in response to user requests. In some embodiments, the mashup design application may also be operable to generate XSLT transformations that may be used to convert a XML-based definition of a mashup into a format suitable for rendering into clients and devices of various types (such as, for example, web browsers, cell phones, PDAs, etc.).

In this manner, instead of requiring widgets to talk directly to each other according to a common protocol or specification, the example method illustrated in FIG. 1 allows widgets to pass parameters to other widgets and to receive parameters from the other widgets through variables that are automatically defined in the mashup. The techniques described herein do not require the widgets to conform to a common standard, specification, or protocol, and this allows greater flexibility of use and greater inter-operability of widgets that may come from a wide variety of sources, repositories, or technologies. Further, from a user's experience perspective, a user only needs to insert the widgets into a mashup and to visually relate the widgets in the desired manner; the rest of the operations needed to determine the widget parameters and to bind these parameters to mashup variables are performed automatically and transparently to the user. Further, the techniques described herein allow the content of widgets in a mashup to be refreshed during run-time in response to detecting events that indicate changes in the data managed within the mashup.

III. Example Embodiment in a Computer Program Product

In some operational contexts, the techniques for designing mashups described herein may be implemented in a computer program product that is stored on one or more storage media and that is executable by one or more computing devices. For example, the computer program product may be a mashup design application that can be executed by one or more computing devices to provide functionalities in accordance with the techniques described herein. A mashup design application may be implemented as logic in the form of instructions which, when executed by one or more processors in one or more computing devices, are operable to perform the functionalities for designing mashups described herein.

In various embodiments, a mashup design application may be implemented as one or more software components that are executable by one or more processors or as any combination of one or more software and hardware components such as Application-Specific Integrated Circuits (ASICs). For example, a mashup design application may be implemented, without limitation, as a standalone or client-server software application (e.g., an Integrated Development Environment (IDE) application), as one or more software modules (e.g., a collection of software development tools such as visual or command-line editors, code generators, compilers, linkers, etc.), as one or more libraries of functions, as one or more dynamically linked libraries, as one or more active X controls, and as one or more browser plug-ins.

An example of a mashup design application is Serena® Mashup Composer™ that is provided by Serena Software, Inc. of Redwood City, Calif. It is noted that the term "Mashup Composer" is a trademark of Serena Software, Inc.; however, solely for the purpose of the present description, this term is not to be construed as limited to particular products marketed by Serena Software, Inc. under the "Mashup Composer" brand name and, when used in the present description, this term is to be considered as referring to any software application that can be used to design and deploy a mashups.

FIGS. 2A-2E are block diagrams that illustrate a mashup design application according to an example embodiment. The mashup design application of FIGS. 2A-2E, which is operable to provide functionalities in accordance with the techniques described herein, enables non-technical subject-matter experts, such as business users and would-be mashers, to create mashups with an easy-to-use visual modeling tool reminiscent of various office productivity tools. For example, the mashup design application of FIGS. 2A-2E provides a visual WYSIWYG form designer for composing the interaction experience with the users who use the mashup design application to design mashups. The form designer represents a mashup form as data in a XML-based definition at design-time. When the mashup form is previewed (e.g., opened in preview mode), the mashup design application generates the appropriate run-time rendering by applying the pertinent transformations against the XML-based definition. For example, the rendering may include, without limitation, browser-based HTML output, mobile device rendering, etc. In addition to standard web controls available on the form designer palettes (e.g., text fields, text boxes, panels, tabs, buttons, group boxes, expanders, etc.), the form designer provides a set of widget discovery adapters that are operable to discover third party widgets that could be dropped onto the form and automatically configured and bound to mashup variables for run-time rendering.

Figure 2A:
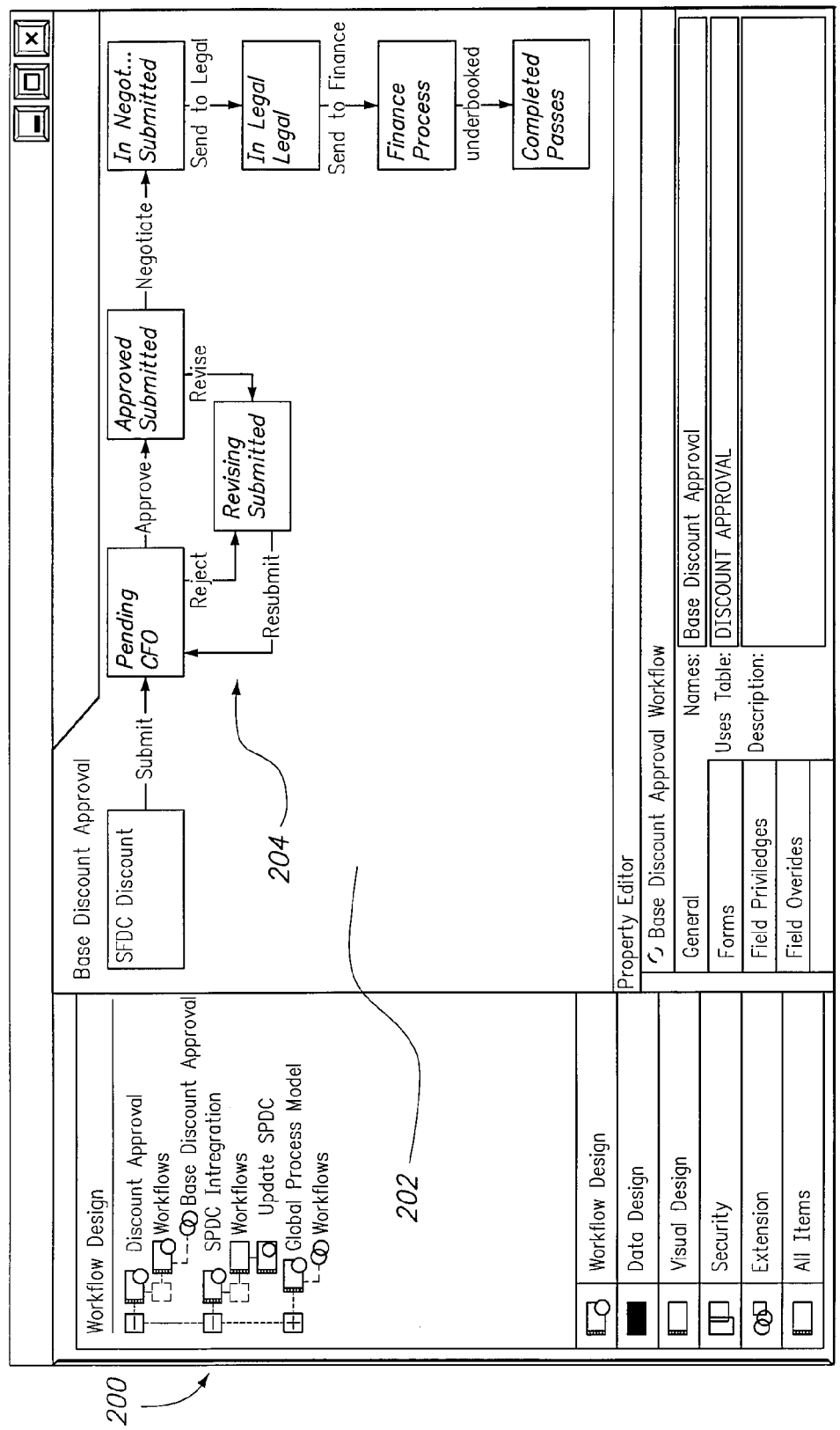
FIG. 2A is a block diagram that illustrates an example mashup design application according to an example embodiment.

Referring to FIG. 2A, mashup design application 200 includes a drag-and-drop interface that, in addition to providing for design of mashups, also provides for design of business processes (e.g., human workflows), layout user interfaces, and orchestration processes that may connect to other enterprise systems such as, for example, system orchestrations compliant with Web Services Business Process Execution Language (WS-BPEL).

As illustrated in FIG. 2A, mashup design application 200 includes various GUI areas, such as workspace area 202. According to the techniques described herein, workspace area 202 is configured for receiving user input that defines and designs a mashup and/or one or more mashup forms and components. For example, among various GUI objects that a user who is designing a mashup can use, the user may enter in workspace area 202 (e.g., by dragging and dropping from other workspace areas or content panes) GUI objects that represent widgets and GUI objects and other visual graphical symbols that represent the relationships which the user wants to establish in the mashup between the widgets. As indicated by reference numeral 204, examples of GUI objects and other visual graphical symbols that can be used by a user to establish relationships among the various mashup components (e.g., widgets) may include, without limitation, lines, arrows, labels, boxes, circles, dots, lists, bars, or any other suitable visual symbols that may be designated by a mashup design application to indicate a particular operation, action, or relationship.

According to the techniques described herein, mashup design application 200 detects user input that relates a first GUI object, which represents a first widget, to a second GUI object that represents a second widget, where the two widgets are included into and are to be rendered by a mashup that is being designed by a user of the mashup design application. In various implementations, the mashup design application may detect such input at the time the input is being entered by the user who is designing a mashup and/or at the end of design-time when the mashup design application generates a definition of the entire mashup.

In response to the user input that relates the two GUI objects that represent the two widgets, mashup design application 200 determines that the user intends to integrate the two widgets so that the output of the first widget is to be provided as input to the second widget. Mashup design application 200 then carries out the integration transparently to the user by automatically defining a variable which, at run-time when the mashup is executed, is assigned the value of an output parameter of the first widget and is passed as an input parameter of the second widget. In response to the user input, mashup design application 200 may also generate an event definition for an event which, when detected at run-time when the mashup is executed, causes the contents of one or both of the widgets to be refreshed. In this manner, by automatically processing user input that visually relates widget-representing GUI objects but does not expressly provides instructions for integrating the widgets, mashup design application 200 allows for the design of a mashup that includes multiple widgets, where the widgets can pass parameters to other widgets and to receive parameters from the other widgets through variables that defined in the mashup. By automatically generating event definitions, mashup design application 200 also allows the content of the widgets in the mashup to be refreshed during run-time in response to detecting events that indicate changes in the data managed within the mashup. It is noted that mashup design application 200 may use the variable binding mechanism and the eventing mechanism to integrate any number of widgets. Thus, any examples described throughout herein that involve only two widgets are to be regarded in an illustrative rather than a restrictive sense.

Figure 2B:
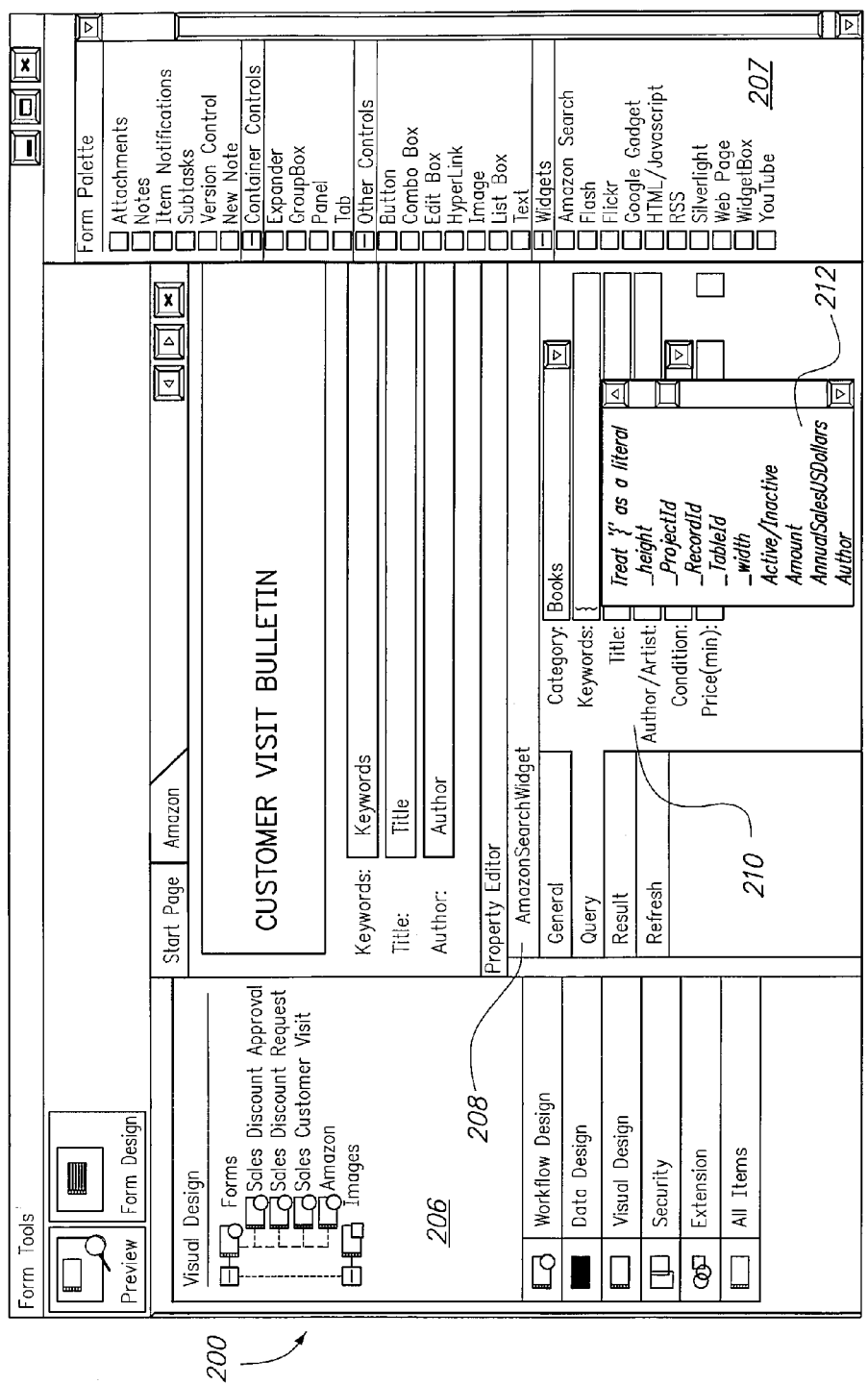
FIG. 2B is a block diagram that illustrates an example mashup design application operable to integrate a widget into a mashup according to an example embodiment.

FIG. 2B is a block diagram that illustrates the example mashup design application 200 that is operable to integrate an Amazon search widget into a mashup. The mashup is being designed and developed by a user who provides input through visual form tools and controls that are provided in various content panes and palettes. For example, visual design pane 206 includes a list of the forms, widgets, and other controls that the user has included in the mashup, and content panes 207 includes various palettes from which the user can select mashup objects such as a form palette, container control palette, and widgets palette.

As illustrated in FIG. 2B, the user has included an Amazon search widget on a mashup form and mashup design application 200 has automatically generated a configuration property editor 208 that provides a tabbed display with the various parameters of the Amazon search widget. Some of the input parameters available for this widget include general information parameters (e.g., author name, caption, etc.), query information parameters 210 (which specify search criteria), result information parameters (which indicate what information will be returned to the user), and event information parameters (which specify events the occurrence of which would cause update of the widget content). To facilitate easier use, mashup design application 200 automatically configures property editor 208 to show various default or possible values for various parameters of the widget. For example, as illustrated in FIG. 2B, property editor 208 displays a list of values 212 that the Amazon search widget can accept for at least some of query information parameters 210. According to the techniques described herein, some or all of query information parameters 210 may be bound to text fields or other controls in the mashup form, which text fields or controls (e.g., fields "Keyword", "Title", "Category", etc.) are configured to receive data values that are provided during the mashup run-time.

Figure 2C:
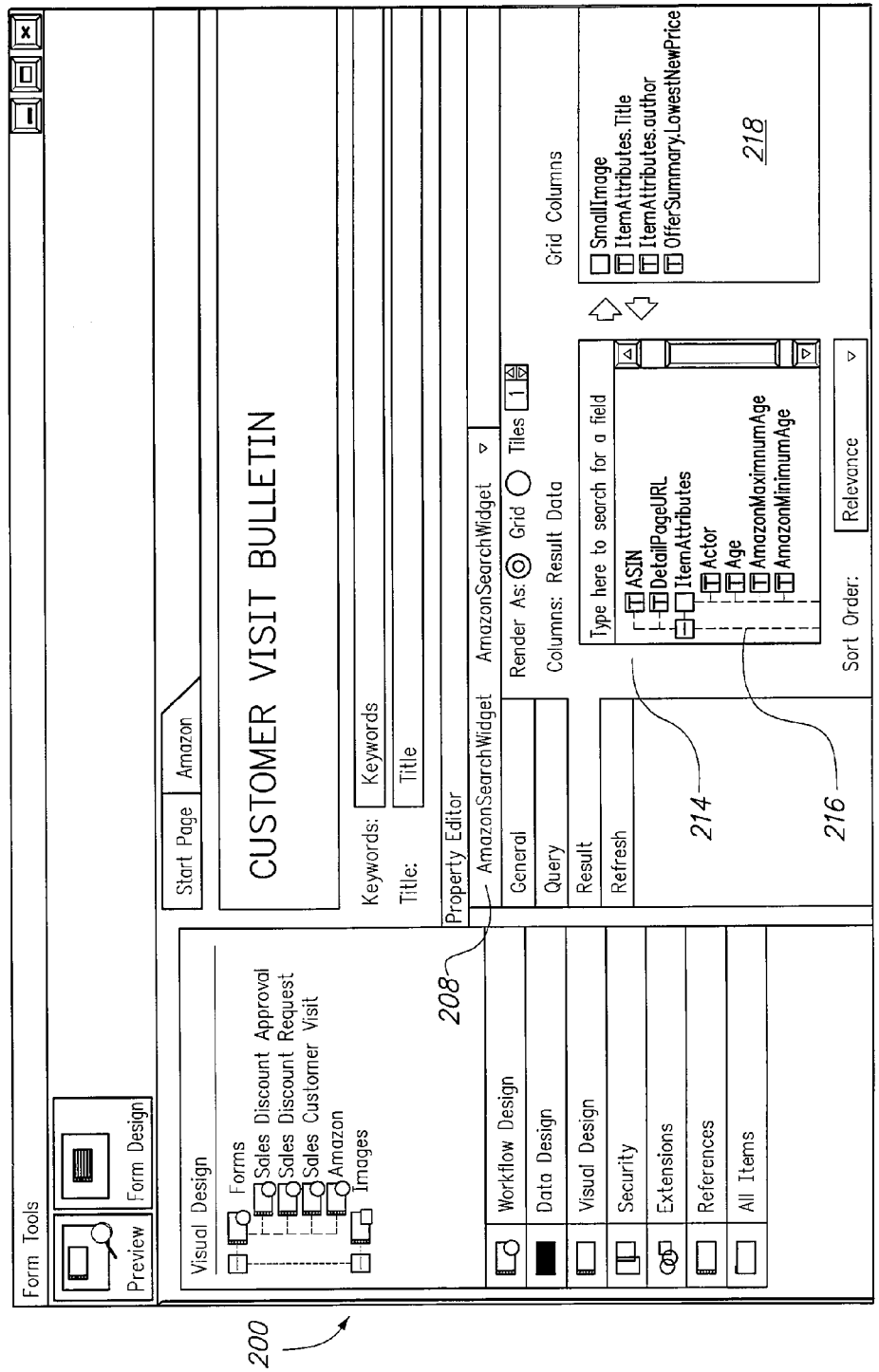
FIG. 2C is a block diagram that illustrates an example mashup design application operable to configure the properties of a widget according to an example embodiment.

FIG. 2C is a block diagram that illustrates result information parameters 214 that are provided by mashup design application 200 in property editor 208 for the Amazon search widget illustrated in FIG. 2B. Result information parameters 214 indicate what result data will be returned by the Amazon search widget during the mashup run-time and in what format. As illustrated in FIG. 2C, the output information parameters of the Amazon search widget include an output parameter that specifies that the result data may be returned in a grid format having various columns. According to the techniques described herein, mashup design application 200 automatically configures property editor 208 to show the user designing the mashup a list of available result columns 216 and allows the user to select therefrom a list of returned columns 218 that will be shown in the mashup at run-time. If indicated by user input (not shown in FIG. 2C), mashup design application 200 also allows some or all of returned columns 218 to be bound to text fields or other controls in the mashup form, so that the values of these return columns 218 (e.g., "ItemAttributes.Title", "ItemAttributes.Author", "OfferSummary.LowestNewPrice") that are returned during the mashup run-time may be used by other widget(s) and/or logic configured in the mashup.

Figure 2D:
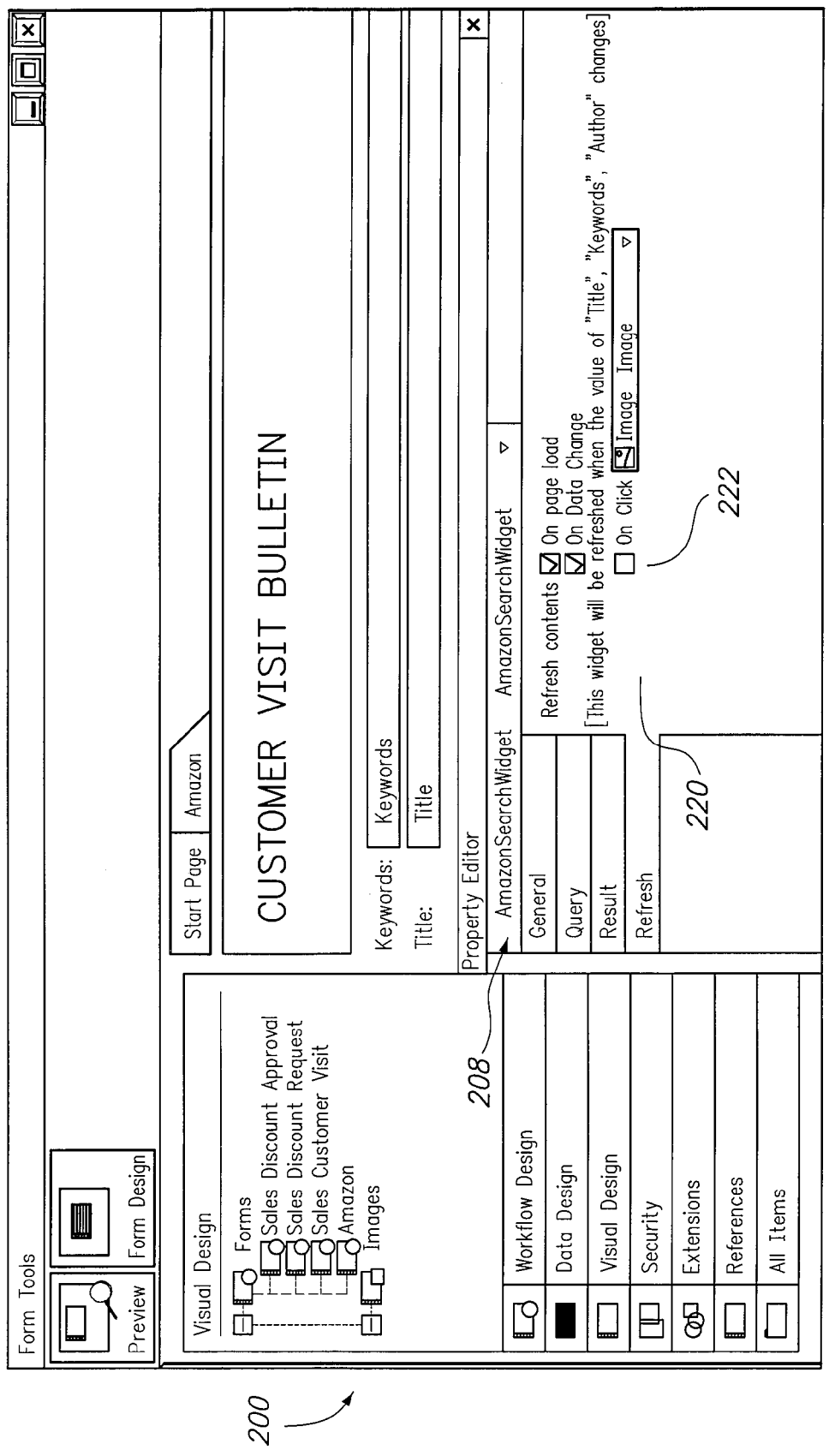
FIG. 2D is a block diagram that illustrates an example mashup design application operable to configure events for a widget according to an example embodiment.

FIG. 2D is a block diagram that illustrates event information parameters 220 that are provided by mashup design application 200 in property editor 208 for the Amazon search widget illustrated in FIG. 2B. Event information parameters 220 specify events the run-time occurrence of which would cause the content of the Amazon search widget to be updated. As illustrated in FIG. 2D, event parameters 222 of the Amazon search widget indicate that the content of the widget may be updated or refreshed during run-time in response to an On-Page-Load event, an On-Data-Change event, and an On-Click event. According to the techniques described herein, mashup design application 200 allows the user designing the mashup to select which events of the Amazon search widget would cause the content of the widget to be updated at mashup run-time. In response to the user selection, mashup design application 200 automatically generates event definition(s) for the event(s) selected by the user and subsequently includes these event definition(s) in one or more binding definitions that are generated for the mashup being designed. In some embodiments, the event definitions generated for a specific widget may be in the same format as the event definitions provided for the widget in that widget's contract. In other embodiments, the event definitions generated for a specific widget may conform to a specific format that is understood by the servers and processes that comprise the run-time execution environment in which the mashup is to be executed. Further, it is noted that different widgets may be responsive to various other events and types of events (e.g., On-Form-Load events and On-Mouse-Over events). Thus, the techniques described herein are not limited to any particular format of event definitions or to any particular events or types of events which, during mashup run-time, would cause the content of the widgets to be refreshed.

Figure 2E:
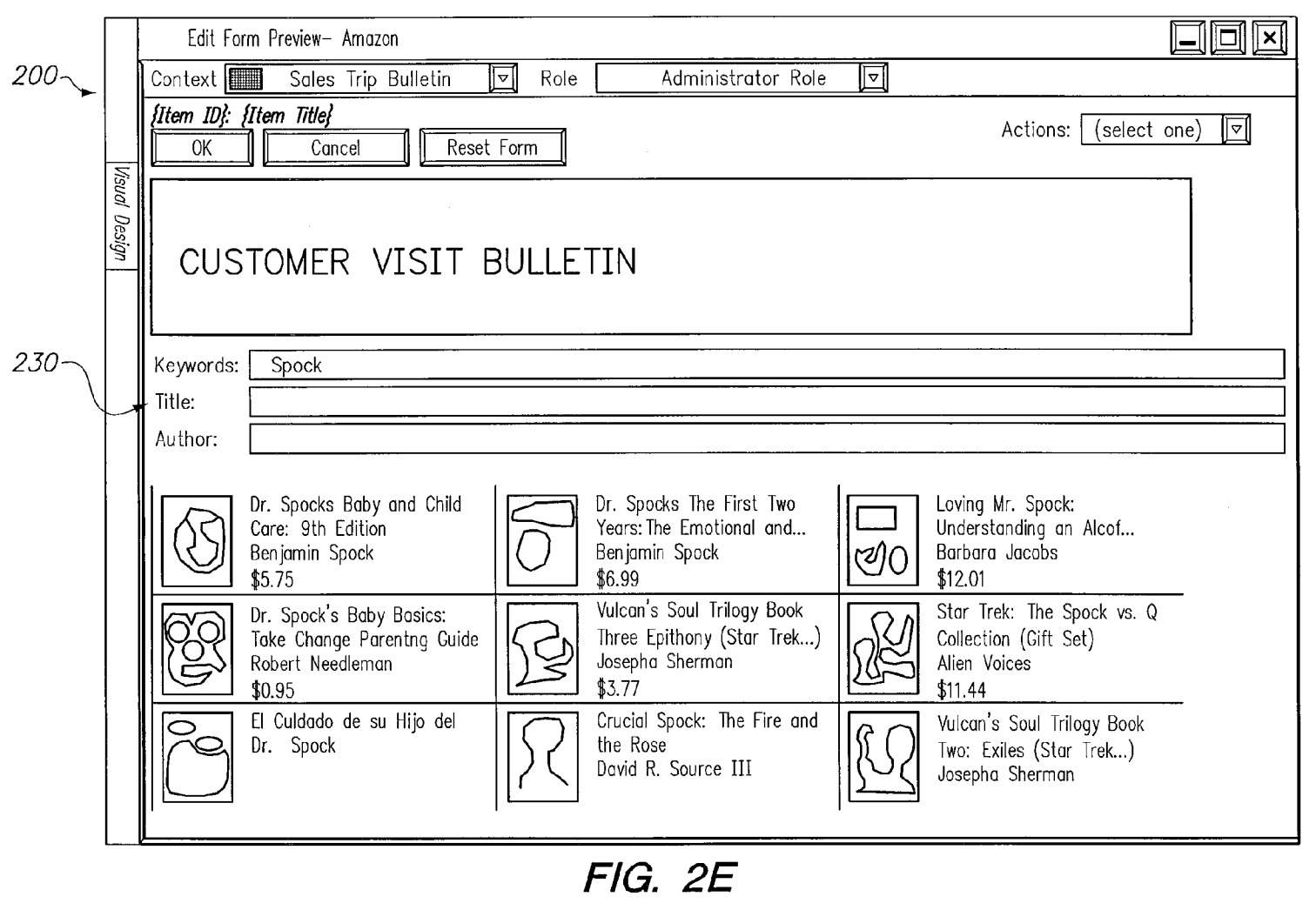

FIG. 2E is a block diagram that illustrates a run-time mashup preview provided by mashup design application 200 for the Amazon search widget illustrated in FIG. 2B. Mashup design application 200 provides run-time mashup preview 230 of the Amazon search widget by executing at least a portion of mashup code that references the widget, and thus run-time mashup preview 230 is identical in operation and functionality as the run-time rendering of the widget. According to the techniques described herein, the run-time mode of mashup design application 200 allows the user to provide input to the Amazon search widget and to get actual results that conform to the widget parameters specified by the user. As illustrated in FIG. 2E, the user has provided as search criteria the keyword "Spock". The keyword value is entered in a text field that is dynamically bound to the "Keyword" input parameter of the Amazon search widget, and the widget returns results that are formatted in accordance with the widget output parameters specified by the user that is designing the mashup.

IV. Example Design and Execution Environment

Figure 3:
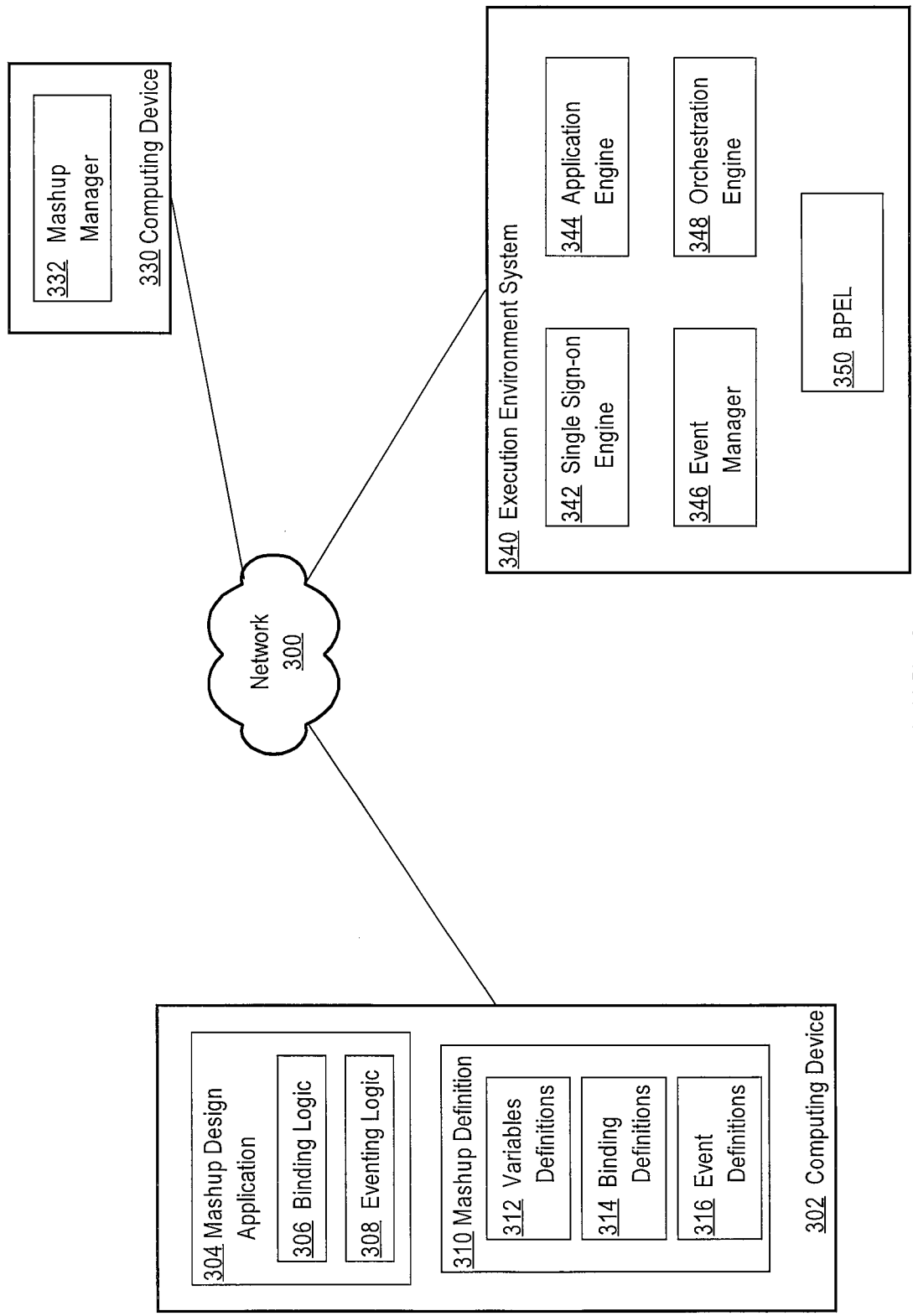
FIG. 3 is a block diagram that illustrates a mashup design, deployment, and execution environment according to an example embodiment.

FIG. 3 is a block diagram that illustrates a mashup design, deployment, and execution environment according to an example embodiment. In the operational context of FIG. 3, a computing device 302 is communicatively connected over network 300 to computing device 330 and to execution environment system 340. Computing device 302 is used by a user to design a mashup, computing device 330 is used to deploy the mashup, and execution environment system 340 is operable to execute the deployed mashup.

Computing device 302 may be, without limitation, a laptop computer system, a desktop computer system, or any other device that can execute a mashup design application 304 for a user that is designing a mashup. According to the techniques described herein, mashup design application 304 includes binding logic 306 and eventing logic 308.

Binding logic 306 may be implemented as a set of instructions which, when executed by one or more processors in computing device 302, are operable to perform the variable binding mechanism described herein. For example, in response to the user input that relates two GUI objects that represent the two widgets in a mashup that is being designed, mashup design application 304 may determine that the user intends to integrate the two widgets so that the output of the first widget is to be provided as input to the second widget. Mashup design application 304 then invokes binding logic 306, which transparently to the user automatically defines a variable to bind the output parameter of the first widget to the input parameter of the second widget. To bind the variable, binding logic 306 may generate code and/or data structures which, at run-time when the mashup is executed, cause the variable to be assigned the value of the output parameter of the first widget and to be passed as an input parameter of the second widget. In this manner, by automatically processing user input that visually relates widget-representing GUI objects but does not expressly provide instructions for integrating the widgets, mashup design application 304 allows for the design of a mashup that includes multiple widgets, where the widgets can pass parameters to other widgets and to receive parameters from the other widgets through variables that are automatically defined in the mashup.

Eventing logic 308 may be implemented as a set of instructions which, when executed by one or more processors in computing device 302, are operable to perform the eventing mechanism described herein. For example, in response to user input that selects or defines one or more content-refresh events for one or more widgets in the mashup that is being designed, mashup design application 304 invokes eventing logic 308. When invoked, eventing logic 308 examines the user input and generates event definitions for the one or more events selected by the user. The one or more events are such that, when detected at run-time when the mashup is executed, they cause the contents of the one or more widgets to be refreshed. In this manner, by automatically generating event definitions, mashup design application 304 allows the content of the widgets in the mashup to be refreshed during run-time in response to detecting events that indicate changes in the data managed within the mashup.

In an operational example, a user may login to or otherwise access computing device 302 for the purpose of designing a mashup. Through a graphical or other user interface, the user provides input that designs and defines the mashup. For example, a visual configuration layer in mashup design application 304 allows the user to drag-and-drop GUI objects that represent widgets and other mashup components, but hides from the user the complexity that is going on underneath to integrate the widgets and the mashup components. The process of receiving the user input may involve mashup design application 304 making calls to or otherwise accessing one or more widget repositories in order to retrieve the contracts and other information for the widgets that are used by the user in the mashup. The different widget repositories (e.g., Google Gadgets, Adobe Widgets, Silverlight, etc.) may store widgets that conform to different widget specifications or to no widget specification at all since the techniques described herein do not require conformance to a common widget specification, or conformance to any widget specification at all, in order to provide integration and interoperability among the widgets in a mashup during run-time when the widgets are rendered.

In response to the user input that defines the mashup, mashup design application 304 invokes binding logic 306 and eventing logic 308 to automatically generate any code and other data structures and elements that may be needed to provide the integration and interoperation functionalities of the widgets in accordance with the techniques described herein.

When the user completes designing the mashup, mashup design application 304 or a component thereof generates mashup definition 310. For example, mashup design application 304 may automatically generate mashup definition 310 in response to the user issuing a command to save the mashup. Alternatively, or in addition to, mashup design application 304 may automatically generate mashup definition 310 in response to user input that specifically requests the definition to be generated. Among other information, mashup definition 310 includes variables definitions 312, one or more binding definitions 314, and one or more event definitions 316. Variable definitions 312 define and describe the variables (e.g., various form controls such as text boxes, list boxes, combo boxes, etc.) that are automatically defined by mashup design application 304 for the purpose of binding static or dynamic mashup data and the widget parameters of various widgets. Binding definitions 314 associate mashup variables with the input and/or output parameters of the various widgets used in the mashup in accordance with the input provided by the user who is designing the mashup. Event definitions 316 include the definitions of the events, which are identified in the user input and which, when detected at mashup run-time, cause the contents of the widgets in the mashup to be refreshed.

After being generated, mashup definition 310 may be transferred or sent to mashup manager 332 that is executing in computing device 330. For example, in response to user input that specifies the mashup to be saved and/or deployed, mashup design application 304 may send mashup definition 310 to mashup manager 332 for deployment. It is noted that in various embodiments, the mashup manager may be a component of the mashup design application or may be a separate component that executes on the same computing device as the mashup application. Thus, in FIG. 3 the depiction of mashup manager 332 as executing in a separate computing device from mashup design application 304 is for illustrative and exemplary purposes only.

Mashup manager 332 is operable to deploy mashups for execution. Mashup manager 332 may be implemented as a set of instructions which, when executed by computing device 330, are operable to generate deployment information that can be used to deploy a mashup to an execution environment system, such as system 340. Mashup manager 332 is configured to receive a logical definition of a mashup such as, for example, mashup definition 310. Mashup manager 332 may also be configured to receive configuration information that specifies the configurations of one or more execution components, modules, or servers in an execution environment system that are operable to execute the mashup. For example, mashup manager 332 may be operable to provide the GUI interfaces and other forms, as well as the underlying logic, through which a user may provide the configuration information that defines where and how a mashup and portions thereof are to be executed. Alternatively, or in addition to, mashup manager 332 may be configured to retrieve and determine the configuration information from a repository such as, for example, a database, a directory, or a set of configuration files stored in a file system.

Based on mashup definition 310 and/or on execution configuration information for a mashup, mashup manager 332 may deploy, or cause the deployment of, the mashup to execution environment system 340. For example, mashup manager 332 may install any elements or processes included in the mashup to execution environment system 340 by determining the execution components and any access parameters therefor (e.g., network addresses, port numbers, login information, etc.) from mashup definition 310 and/or from execution configuration information for the mashup. Mashup manager 332 may also generate other deployment information that can be used to deploy and execute a mashup. The deployment information for a mashup may include one or more data structures in which various mashup portions are assigned to different components (e.g., servers, services, etc.) for execution. For example, the deployment information for the mashup may store data indicating which forms and GUI elements of the mashup are to be executed by which web servers as well as a mapping that associates operations specified in the mashup with one or more network addresses of one or more servers that are operable to execute the operations. In some embodiments, the mashup manager may also generate any other code or information that is not included in the definition of the mashup but is needed for executing the mashup. For example, along with the deployment information, the mashup manager may compile into executable code any source code that is provided in the logical definition of the mashup, where the generated executable code may include, but is not limited to: code for rendering GUIs and GUI elements that are operable to receive input from end users at the mashup run-time; code for rendering forms that are operable to receive user input or to display information to end users; scripts conforming to various scripting languages that are operable to provide a particular functionality when the mashup is executed; JavaScript code, VB script code, and any other code, which may be executed on execution components that are virtual machines; executable instructions defined in a markup language, such as XML or HTML; and instructions in extensible transformation languages, such as XSLT or CSS templates. In some embodiments, the mashup manager may store at least portions of the deployment information (e.g., such as event definitions) in a data repository, such as a directory or a database, and make that information accessible to the execution components during run-time when the mashup is executed. As a result, an execution component that executes the mashup would be able to automatically determine and retrieve any necessary information during the mashup runtime.

Execution environment system 340 is operable to execute deployed mashups. In the embodiment illustrated in FIG. 3, execution environment system 340 comprises single sign-on engine 342, application engine 344, event manager 346, orchestration engine 348, and Business Process Execution Language (BPEL) engine 350. In operation, single sign-on engine 342, application engine 344, event manager 346, orchestration engine 348, and BPEL engine 350 are communicatively and/or operably coupled to each other and are capable of making calls to or otherwise invoking the interfaces and functionalities of each other during the execution of a mashup.

In various embodiments, each of single sign-on engine 342, application engine 344, event manager 346, orchestration engine 348, and BPEL engine 350 may be implemented as a combination of software and/or hardware elements which, when executed, may be allocated computational resources, such as memory, CPU time, and/or disk storage space in order to execute a mashup or any portions thereof. For example, in operation each of execution components 342, 344, 346, 348, and 350 may be a module that is executing as, or within, servers, services, virtual machines, daemons, and any other computer system processes that are allocated computing resources and are configured to execute mashups and/or portions thereof. In various embodiments, the various execution components of an execution environment system may be included on same computer system or hardware platform, on a cluster of interconnected computer systems or hardware platforms, or may be distributed on different computer systems or hardware platforms over a network. Further, in various embodiments the functionalities of execution components 342, 344, 346, 348, and 350 may be implemented in the same integrated module or may be combined in two or more modules that may provide some additional functionalities. For these reasons, the depiction of execution environment system 340 in FIG. 3 and the execution components thereof are to be regarded in an illustrative rather than a restrictive sense.

In the operational context illustrated in FIG. 3, single sign-on engine 342 of execution environment system 340 is operable to identify and authenticate various types of users that are involved in a mashup's life-cycle. These types of users may include, without limitation, users that design mashups (e.g., mashup designers), users that deploy mashups (e.g., IT personnel and network administrators), and end users that execute mashups to gain the functionalities and results produced by the mashups. In some implementations, single sign-on engine 342 may further be operable to perform user identification, authentication, and authorization functions and to validate and deliver the appropriate user identities to the other execution components in execution environment system 340. In some embodiments, the single sign-on engine may include program logic that performs user identification and authentication. In other embodiments, the single sign-on engine may be communicatively connected to servers or services that can provide user authentication; examples of such servers or services include, but are not limited to, authentication authorization accounting (AAA) servers, network domain controllers, Active Directory servers, Lightweight Directory Access Protocol (LDAP) servers, and the like.

Application engine 344 of execution environment system 340 is operable to execute various applications that may be invoked or otherwise accessed by a mashup during the mashup run-time. For example, application engine 344 may include a trusted transaction server that implements an Internet Server Application Programming Interface (ISAPI) and that is operable to make calls to or otherwise invoke various web services that are accessed by the mashup. Application engine 344 may also include a notifications sever and an e-mail client for receiving and sending messages and other notifications during the mashup run-time.

Event manager 346 of execution environment system 340 is operable to detect and process various events that are raised by widgets and other mashup components during the execution of the mashup. For example, event manager 346 may be configured to receive, resolve, and route events that are raised by the various other execution components in execution system environment 340 (e.g., execution components 342, 344, 348, and 350), as well as events that are raised by external services accessed by the mashup during run-time. In some embodiments, the event manager may store an event mapping for the mashup in one or more data structures. The event mapping may include data that indicates which operations, of the widgets and other components of the mashup, are to be invoked in response to which events defined in the mashup. For each event that is defined in the mashup event definitions, the event mapping may include data that identifies the operation that is to be invoked in response to the event, as well as any other data associated with the operation and/or with the event including, but not limited to, the data type and the number of input parameters for the operation, the event ID, the type of the event, and the type and/or identity of the entity that is allowed to raise the event during runtime.

Orchestration engine 348 of execution environment system 340 is operable to execute and/or cause the execution of orchestration processes that are included in a mashup. As used herein, "orchestration process" refers to a sequence of operations defined in a mashup that is performed automatically without requiring or being responsive to user input or to other types of human interactions. During the mashup run-time, orchestration engine 348 may execute or cause the execution of an orchestration process defined in the mashup in response to requests or calls from other execution components of execution environment system 340 through various inter-process communication mechanisms such as, for example, various message-based protocols, shared memory, application programming interfaces (APIs), and call-back interfaces. In some embodiments, the orchestration engine may be operable to execute an orchestration process by creating and initializing an instance of the orchestration process, to receive or otherwise detect output from operations in the process, and to raise events in response to the detected output.

BPEL engine 350 of execution environment system 340 is operable to execute and/or cause the execution of business processes and human workflows that are defined in a mashup. As used herein, "business process" refers to a sequence of operations that represent the interaction between multiple businesses or some elements thereof, and "human workflow" refers to a sequence of operations that may be performed in response to input provided by one or more end users of the mashup during the mashup run-time. In some embodiments, the BPEL engine is operable to execute mashup operations that are defined in a mashup definition in accordance with an XML-based BPEL programming language such as the Web Services Business Process Execution Language (WS-BPEL). In some embodiments, the BPEL engine may be configured to coordinate and interpret interactions with end users that are defined in one or more human workflows in the mashup.

In the embodiment illustrated in FIG. 3, the techniques described herein are implemented in a mashup design application that is intended to be used by technologically unsophisticated users such as business analysts or users. The mashup design application may be implemented as an integrated development environment that allows for specifying the widgets, services, human interactions, and other program logic that will constitute a mashup. To simplify the design process, according to the techniques described herein the mashup design application implements a visual configuration layer which abstracts away the functional and physical layers that specify how the mashup is to be defined, deployed, and executed. Because of this abstraction, the design of the mashup is simplified and is independent of the details of the integration of the various mashup components and the eventual execution environment in which the mashup will execute. As a result, without having extensive software or technical knowledge, by using the mashup design application a business analyst or user is able to easily design and develop mashups that integrate widgets with other widgets and components in the mashups and implement arbitrarily complex program logic.

V. Design-Time Binding of Widget Parameters

The techniques described herein provide a variable binding mechanism to automatically determine the input and output parameters of widgets and to automatically bind the widget parameters to variables in a mashup. At mashup design-time, the techniques described herein allow a user to drag-and-drop various widgets into one or more mashup forms. The widgets' input and/or output parameters are then automatically determined and bound to variables, fields, and other controls in the mashup and/or the mashup forms. Thus, the techniques described herein achieve widget interoperability by automatically binding the input/output parameters of the mashup widgets to data and context variables in the mashup. In this manner, instead requiring widgets to talk directly to each other according to a common protocol, the techniques described herein allow widgets to pass parameters to other widgets and to receive parameters from the other widgets through variables defined in the mashup at design-time. This does not require the widgets to conform to a common standard or protocol, and thus allows greater flexibility of use and greater interoperability of widgets that may come from a wide variety of sources or technologies. Further, from a user's experience perspective, a user only needs to insert a widget into a mashup; the rest of the operations needed to discover the widget parameters and to bind these parameters to mashup variables are performed automatically and transparently to the user.

In an example embodiment, a mashup design application may implement the variable binding mechanism by providing logic that automatically binds the input/output parameters of the mashup widgets to variables that may include, without limitations, fields and controls on the mashup forms, data variables that are designated for storing data returned directly by individual web service invocations, data variables that are designated for storing data returned synchronously from WS-BPEL orchestration process invocations, data fields persisted as part of human workflows, and data variables that are designated for storing HTML-based web content. According to the techniques described herein, the variable bindings in the mashup are normalized and stored in XML-formatted binding definitions that are included in the definition of the mashup. At the time of deployment and generation of the mashup, the variable binding definitions are converted into the run-time code, scripts, and/or mappings that implement the widgets behavior and the widget interoperability desired by the user that designs the mashup.

In some embodiments, a set of widget discovery adapters may be used for automatically determining the contracts of widgets that are included and to be rendered in a mashup. As used herein, "contract" of a widget refers to a set of data that describes the widget's input and output parameters, interfaces, methods, properties, and any other information that describes the widget or any functionality thereof. After the contract of a widget is automatically determined, at design-time the widget may be configured within the mashup and bound to context variables, fields, or controls that are defined in the mashup. Configuring the widget may include, without limitation, binding the widget parameters to fields in a form or forms of the mashup and configuring the static parts of the widget (e.g., position, appearance, etc.).

For example, a mashup design application may invoke one or more widget discovery adapters that are operable to interrogate widgets from a variety of sources and to retrieve the widgets' contracts. The contract of a widget provides information that indicates the input and output parameters of the widget. For instance, web-based widgets are typically based on technology that relies on URL representations. When the contract of a web-based widget is interrogated, a URL is determined that includes various URL-based parameters that may be passed to and/or returned from the widget. To determine the URL-based parameters, a widget discovery adapter may examine the URL for the widget and may determine what parameters are passed to and/or returned from the widget.

According to the techniques described herein, after the parameters for a widget are discovered, these parameters are bound to variables, fields, and other controls that are included in a mashup and the GUI forms and frames thereof. For example, a widget discovery adapter may discover a weather widget that takes a ZIP-code as input parameter, and may store the widget along with the ZIP-code input parameter in a widget repository. Thereafter, when a user uses a mashup design application to design a mashup, the user may drag-and-drop the weather widget into a form of the mashup. As (or after) the weather widget is inserted into the mashup form, the mashup design application automatically associates and binds the ZIP-code input parameter of the widget to a variable in the mashup that is designated for storing a zip code. The variable may represent static mashup data (e.g., a text field or a label on a form that stores the zip code of a mailing address) or may represent a data value that is dynamically returned from a service call or from another widget. The association and binding of the ZIP-code input parameter of the weather widget to the mashup variable is performed automatically as (or after) the user drags-and-drops the widget into the mashup. Further, if the ZIP-code input parameter is bound to a variable that is assigned a data value which is returned at run-time from a service call or from another widget, an event definition or other code may be automatically generated to cause the content of the weather widget to be automatically updated and refreshed every time a new data value is returned during run-time from the service call or from the other widget.

In some embodiments, the techniques described herein allow widget parameters to be bound to variables that are designated for storing data values that are received dynamically during the mashup run-time. For example, a variable bound to the input parameter of a widget may be assigned a data value that is received interactively at run-time from an end user of the mashup through a mashup GUI form. In another example, a variable bound to the input parameter of a widget may be assigned a data value that is received at mashup run-time from a human workflow and/or from an orchestration process that is included in the mashup. In another example, a variable bound to the output parameter of a widget may be assigned a data value that is returned from the widget at mashup run-time, where the variable is subsequently used as input to a human workflow and/or to an orchestration process that is included in the mashup. Thus, the techniques described herein are not limited to any particular type or manner of binding mashup variables to widget input/output parameters.

For example, in some embodiments an execution environment system may provide a process engine that is operable to execute a mashup and to dynamically pass data to and from the mashup. The process engine may be also operable to execute various orchestration processes and workflows that are defined in the mashup. In these embodiments, suppose that a mashup defines a workflow process that looks up various data from a SalesForce.com web service, where one data value received from the web service is a zip code. Using the techniques described herein, at design-time a user may insert a weather widget into the mashup and may provide input (e.g., a visual object such as a line, arrow, etc.) that connects the workflow process to the weather widget. As a result, at design-time a variable representing the zip code returned from the web service is automatically bound to the input parameter of the weather widget. At run-time, the process engine executes the mashup and makes a service call at the process level to the SalesForce.com web service. In response to the service call, a particular zip code is returned from the SalesForce.com web service and is stored in the variable. Then, since at design-time the variable was designated as the input parameter of the weather widget, the weather widget is updated automatically to show the weather forecast for the particular zip code that is returned from SalesForce.com web service.

In some embodiments, the binding of mashup variables to widget parameters may be based on the data types of the parameters passed to or returned from the mashup widgets. Examples of such data types include, but are not limited to, number data types (e.g., integer, float, double, long, etc.), character data types (e.g., char, varchar, string, etc.), and various more complex data types (e.g., arrays, collections, sets, tables, etc.) The data type of a widget parameter may be determined based on user input that inserts a widget into a mashup or visually relates a GUI object representing one widget to a GUI object that represents another widget. The data type of a widget parameter may also be determined by a widget discovery adapter that interrogates the contract of the widget. After the data type of a widget parameter that needs to be bound is determined, a variable of a suitable and comparable data type may be automatically declared or may be selected from a list or a table of pre-defined variables. In this manner, the techniques described herein allow for automatic generation of mashup code that causes mashup variables, text fields, and other GUI controls to be bound to widget parameters at the mashup design-time.

VI. Widget Eventing

The techniques described herein provide an eventing mechanism to drive a dynamic rules-driven refresh of the content of widgets in a mashup in response to detection during run-time of data changes in the bound widgets' input parameters. By providing for configuring and storing event definitions and binding definitions at design-time, the techniques described herein allow for the designing of a mashup that is operable at run-time to fully control and modify the behavior of its widgets as desired and to update the widgets' contents based on the occurrence of the defined events.

According to the techniques described herein, the widget eventing mechanism allows a user designing a mashup (e.g., a mashup designer) to specify which events need to be detected at run-time and how the detection such events affects the rendering and/or refreshing of widget content at run-time. For example, the occurrence of defined events may be detected at run-time when the mashup is executed at a mashup server. In response to detecting the events, the mashup server causes the affected widgets to be updated or refreshed in accordance with the content variables to which the widgets' input and/or output parameters are bound. The events, which are defined at design-time for detection at run-time, include any events that may be raised automatically by mashup components or in response to user input; examples of such events include, but are not limited to, the loading of a page or form of the mashup, a click or another action (e.g., entry of data) performed by an end user on a GUI control, a mouse-over action on a GUI control, and any other web page or GUI-related events.

According to the techniques described herein, the specific details of content-refresh events for mashup widgets are specified in XML-based definitions that are generated automatically at the mashup design-time. For example, in some embodiments an XML-based binding definition may specify which input and/or output parameters of which widgets are going to be dynamically changed at run-time in response to which events. When the mashup is registered or installed at a mashup execution system that includes a mashup server, based on the XML-based binding definition the mashup server would automatically generate, provide, or otherwise include in the mashup any Javascript functions and/or other service calls that implement the widget-related events specified in the XML-based binding definition. At run-time when the mashup is rendered, the mashup server would invoke the Javascript functions and/or the other service calls in response to the occurrences of the specified events, and would cause the contents of the widgets to be refreshed.

In these embodiments, depending on the type of a mashup, the rendering of the widget at run-time may be performed at the mashup server that executes the mashup or at a client browser through which an end user accesses the mashup. For example, for some widgets the mashup server may retrieve, generate, or otherwise obtain the content specified by the widget and would return it to the web browser of the end user. For some widgets, the web browser of the end user may be able to obtain the content of the widgets directly from the back-end components of the widgets without the mashup server being involved. For some widgets, some parts of the widget content may be retrieved or otherwise provided by the mashup server and other parts of the widget content may be obtained directly by the web browser of the end user. Thus, the techniques described herein are not limited to retrieving and updating widget content in any particular manner, and any server-side and client-side data access and rendering mechanisms and any combinations thereof may be used.

According to the techniques described herein, since the parameters of mashup widgets are bound to variables in the mashup, any changes to the mashup variables may trigger events that cause the widget content bound by those variables to be updated. Similarly, any changes to the content of the widget may trigger events that cause updates to the mashup data that is bound by those variables. Events emitted by the mashup widgets can be utilized like any other events from any other mashup processes, workflows, forms, and controls, and like external events that are raised at run-time by entities (e.g., services, daemons, etc.) that are external to the mashup. Unlike other technologies that require widgets to adhere to a common interface for widget interoperability, the techniques described herein provide for a broadcasting mechanism between the widgets and the mashup without requiring the widgets to adhere to a common interface.

In some embodiments, the event definitions generated at the mashup design-time may also include data indicating what actions need to be performed in response to detecting the events described in the event definitions. The event definitions may then be stored in a repository (e.g., a database, a directory, etc.) or in another suitable data storage that can be dynamically queried at the mashup run-time. In these embodiments, when at mashup run-time the occurrence of an event is detected, the execution environment system executing the mashup automatically determines what action or operation to perform in response to the event by locating the event definition of the event in the repository and inspecting the event definition to determine the responsive action or operation.

In some embodiments, a mashup design application implementing the techniques described herein may determine the content-refresh events for a particular widget by automatically interrogating the widget or by inspecting the contract of the widget. The mashup design application may also provide a set of events which are pre-defined and which can be triggered based on static or dynamic mashup data that is not tied to any widgets in the mashup. The mashup design application may display to the user designing a mashup some or all of the events associated with a given widget (including pre-defined events and events determined from the contract of the widget), and the user may select the event(s) which, when detected at run-time, would cause the content of the widget to be refreshed.

For example, a user designing a mashup may place in a mashup form and relate to each other a text field and a search widget. In response, the mashup design application automatically defines a text variable to store the value of the text field. Then, the mashup design application displays to the user a list of events which may trigger a refresh of the content of the search widget. Suppose the user selects an on-data-change event. In response to the user selection, the mashup design application binds the text variable to the on-data-change event and to an input parameter of the search widget. At run-time, when the mashup is executed and the end user provides a search text in the text field, the search text is assigned to the text variable and is passed to the search widget, which renders the result of the search. When the user changes the search text in the text field, the changed search text is assigned to the text variable, and the on-data-change event is triggered to cause the search widget to refresh its content thus effecting a new search in response to the changed search text.

In some embodiments, the techniques described herein allow a user designing a mashup to select or otherwise specify an event which, when detected at run-time, may invoke an orchestration process or a mashup workflow. For example, the user may select an event, which may be raised by an external service or in response to run-time user input, in order to invoke an orchestration process or a mashup workflow. The user designing the mashup can visually embed such events into the mashup logic through visual programming objects (e.g., for-loops, decision points, branching, exception handles, etc.) that are provided in a mashup design application. In this manner, the techniques described herein provide for calling the orchestration processes and workflows synchronously with other processes, user input, and workflows from the front end of the mashup during run-time, and for waiting and displaying the results returned from the orchestration processes and workflows. It is noted that such synchronous events may be used in a mashup to invoke orchestration processes that execute their embedded business logic as web services, and the results returned therefrom may be bound to input parameters of mashup widgets in order to provide a just-in-time update of the widgets' content.

VII. Automatic Widget Discovery

The techniques described herein provide for automatic location and discovery of widgets from a wide variety of sources, repositories, and widget galleries such as, for example, Google Gadgets, Adobe Widgets, Silverlight, WidgetBox, SpringWidgets, etc. Typically, a widget is associated with a contract that describes the widget's input and output parameters, properties, and any other information that describes the widget or any functionality thereof. The widget discovery technique described herein provides for automatically determining the contract of a widget by querying for and/or retrieving the contract from a repository where the widget is stored. The widget discovery technique described herein also provides for determining the input/output parameters and other properties of a widget by directly interrogating the widget when the widget provides an interface for such interrogation.

The widget discovery techniques described herein may be implemented by a mashup design application that provides one or more widget discovery adapters. As used herein, "adapter" refers to logic in the form of a set of instructions which, when executed by one or more computing devices, are operable to determine at least some properties and functionalities of a widget such as, for example, input and output parameters, widget events, and methods of invoking the widget. A widget discovery adapter may be implemented as any suitable hardware and/or software element including, but not limited to, a module, a widget, an active X control, a standalone application, a library of functions, a dynamically linked library, and a browser plug-in.

According to the widget discovery techniques described herein, a mashup design application is operable and configured to determine the particular type of a widget that is specified by a user designing a mashup and, based on the determined widget type, to determine and invoke a suitable adapter that can interrogate the parameters of widgets of that particular type. For example, in response to user input that indicates a widget at mashup design-time, a mashup design application or a component thereof may access a widget repository that stores the specified widget to retrieve and determine the type of the widget specification to which the widget conforms. Based on the type of the widget specification, the mashup design application may then select a widget discovery adapter from multiple adapters that are available to interrogate widgets of multiple different widget specifications. The mashup design application may then use the selected adapter to determine the input/output parameters and other properties of the specified widget by examining the contract of the widget (which may be retrieved from the widget repository) and/or by directly interrogating the widget if the widget includes interfaces for doing so.

In some embodiments, a mashup design application may include a set of widget discovery adapters that are operable to locate, retrieve, and interrogate the contracts of widgets conforming to various widget specifications. For each supported widget specification, a widget discovery adapter is configured and operable to determine input/output parameters and the data types thereof for widgets conforming to that widget specification, other properties of the widgets (e.g., author, title, description, etc.), and any interfaces and methods that the widgets implement. In addition, in these embodiments the mashup design application and/or the widget discovery adapters thereof may be operable to connect to the various widget repositories and libraries and to search the available widgets based on criteria specified by a user who is using the mashup design application to design mashups.

In some embodiments, widgets that have been previously discovered through a mashup design application may be stored in a repository that is shared among multiple users that design mashups (e.g., employees of a particular company or organization). For example, the mashup design application or a component thereof may be configured to automatically register and store in the repository any newly discovered widgets. The mashup design application may provide user interfaces that allow a user to publish specific instances of widgets to the repository for use by others, where a specific instance of a widget has been configured by the user in some specific manner. The mashup design application may also provide user interfaces that allow a user to search the repository for widgets of interest.

In this manner, the widget discovery techniques described herein allow a user who is designing a mashup to transparently discover the parameters and properties of the widgets she wants to use in the mashup without knowing or even realizing that the widgets may conform to different widget specifications. In addition, the widget discovery techniques described herein allow users to register and share previously discovered widgets and any specifically configured instances thereof.

VIII. Automatic Generation of Configuration Interfaces

The techniques described herein provide for automatic in-line generation of configuration interfaces at mashup design-time in order to allow a user to configure the widgets she wants to use in a mashup.

In some embodiments, a mashup design application is configured to automatically generate and display, to a user designing a mashup, widget configuration GUI(s) based on the parameters of a particular widget that is included in the mashup. The user can enter input into the configuration GUI(s) to configure the widget in the mashup. For example, the mashup design application may dynamically generate and display a configuration GUI that includes the input and output parameters and other properties of a specific widget, where the parameters and other properties of the widget may be dynamically discovered and determined in response to the user dragging-and-dropping onto a mashup form a visual GUI object that represents the widget.

One example of a dynamically-generated configuration GUI is property editor 208 in FIGS. 2B-2D. As illustrated in FIGS. 2B-2D, property editor 208 is dynamically generated to display the properties, parameters, and events of an Amazon search widget. For example, FIG. 2B illustrates that property editor 208 is configured to display query information parameters 210 of the Amazon search widget, FIG. 2C illustrates that property editor 208 is configured to display the result information parameters 214 of the widget, and FIG. 2D is configured to display the event information parameters 220 of the widget. It is noted that the widget parameters and properties displayed in property editor 208 in FIGS. 2B-2D are the specific parameters and properties of the Amazon search widget; thus, for another widget that has different parameters and properties, the property editor would be generated to include different tab displays, content panes, and GUI controls.

In an operational example, suppose that a user designing a mashup wants to use the Amazon search widget to search for music CDs. According to the techniques described herein, a mashup design application discovers and/or interrogates the Amazon search widget to determine the properties of the widget, and automatically generates a widget-specific configuration GUI (such as, for example, property editor 208 in FIGS. 2B-2D) that displays to the user the specific properties of the widget. The user then selects and configures through the configuration GUI which widget parameters and properties will be bound and displayed at the mashup run-time—for example, the user may select that the particular instance of the Amazon search widget used in the mashup would only search the music CD category and only the attributes of title, artist, and price for found CDs would be taken from search results returned by widget and bound to variables and GUI controls in the mashup. Any other attributes of search results that may be returned by the Amazon search widget would be disregarded and not processed in the mashup during run-time.

In this manner, the design-time configuration of the widget dictates what the end user of the mashup would see at run-time. The configuration GUI for configuring the widget at design-time is dynamically generated based on the specific properties and parameters of the widget and based on how the user designing the mashup wants to use the widget.

IX. Examples of Widget Integration and Interoperation

Rather than requiring compliance to a common standard or widget specification, the techniques described herein allow for automatic discovery, configuration, and binding of widgets that are provided by various different sources and that conform to various different widget specifications and types. The techniques described herein do not impose any practical limitations on the widgets' specifications, types, and sources as a condition for run-time widget interoperability in a mashup. The techniques described herein provide mechanisms that allow widgets to be consumed regardless of the widgets' origins, designs, or underlying technologies. For example, embodiments of the techniques described herein allow users to drag-and-drop into mashups widgets from different sources (e.g., Google, Flash, Adobe, etc.) while at the same time ensuring transparently to the users that at run-time the widgets will be able to automatically exchange data and pass various data values and arguments to each other and to other mashup components.

The techniques described herein provide a binding mechanism to discover the input and output parameters of widgets and to bind the widget parameters to data and context variables in a mashup. The techniques described herein also provide an eventing mechanism to drive the updating of the widgets' content in response to detecting run-time events such as, for example, data changes in the bound widgets' input parameters. By providing at least the variable binding and eventing mechanisms, the techniques described herein allow a user designing a mashup to achieve at least the same functional interoperability among widgets having different widget specifications that would be achieved by using widgets that conform to the same common specification, protocol, or standard.

The techniques described herein are not limited to being implemented for any particular types or kinds of widgets that conform to any particular types of widget specifications. Rather, the techniques described herein may be implemented for any type of widgets that can be automatically discovered and bound to mashup data and variables. Described hereinafter are some examples that illustrate the mashup interoperability that can be achieved in accordance with the techniques described herein among widgets conforming to various different widget specifications. It is noted that these examples are provided for illustrative purposes only and are thus to be regarded in an illustrative rather than a restrictive sense.

Figure 4:
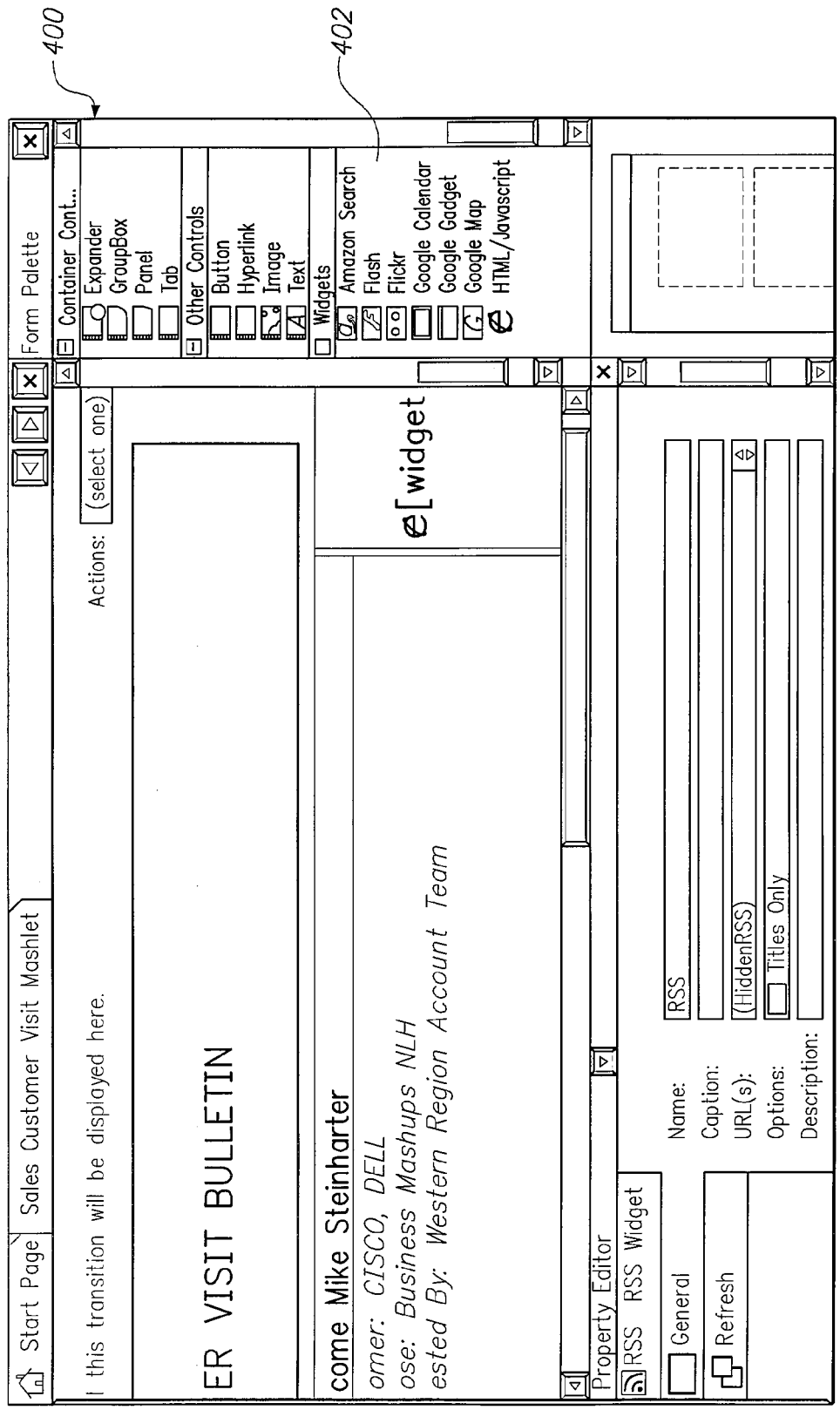
FIG. 4 is a block diagram that illustrates an example mashup design application operable to integrate widgets that have different widget specifications according to an example embodiment.

FIG. 4 is a block diagram that illustrates an example mashup design application that is operable to integrate widgets that have different widget specifications. As illustrated in FIG. 4, mashup design application 400 provides a form palette that includes the expandable widget pane 402. Widget pane 402 displays widgets of various types that have been discovered and widget repositories that are supported. For example, the widgets listed in widget pane 402 include: an Amazon search widget that is provided by Amazon.com and conforms to a widget specification defined for Amazon widgets; a calendar widget and a map widget that are provided by Google Gadgets and conform to a widget specification defined for Google widgets; and an HTML/Javascript widget that does not conform to any particular widget specification. Widget pane 402 also lists three widget repositories—Flash, Flickr, and Google Gadgets—that can be accessed by the user designing the mashup to select from various widgets provided therein.

Figure 5:
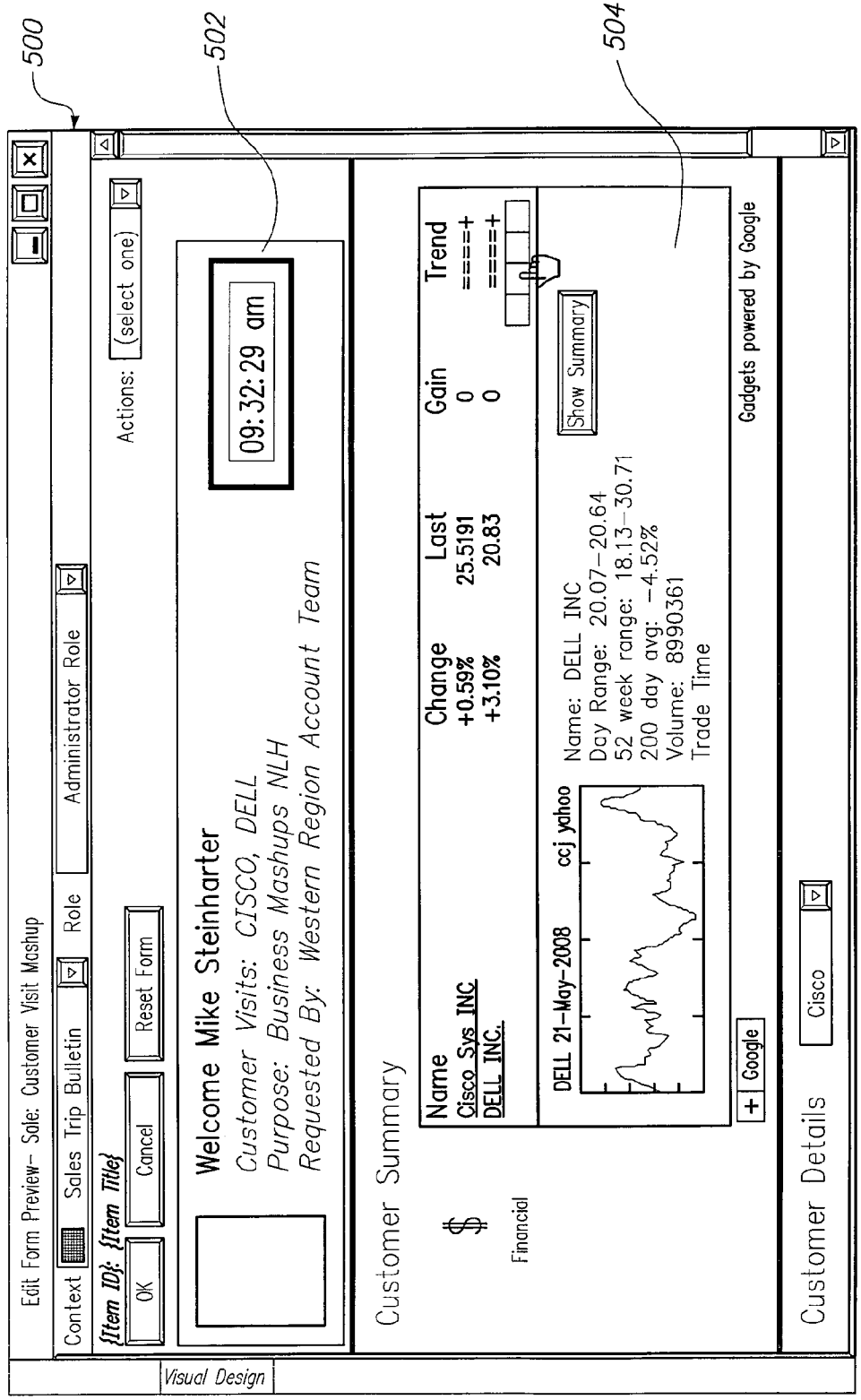
FIG. 5 is a block diagram that illustrates an example mashup design application operable to present a run-time mashup preview of interoperably bound widgets that have different widget specifications according to an example embodiment.

FIG. 5 is a block diagram that illustrates an example mashup design application that is operable to present a run-time preview of interoperably bound widgets that have different widget specifications. Mashup design application 500 provides a run-time preview of a mashup that includes date-time widget 502 and financial performance widget 504 provided by Google Gadgets. The mashup run-time preview is performed by executing at least a portion of mashup code that references widgets 502 and 504, and is thus identical in operation and functionality as the run-time rendering of the mashup. In accordance with the techniques described herein, the output parameter (e.g., date and time) of date-time widget 502 is automatically bound through a datetime mashup variable (e.g., a code variable or a datetime field in the mashup form) to one of the input parameters (e.g., date and time) of financial performance widget 504. Another input parameter of financial performance widget 504 is bound to a mashup variable such as, for example, a list of customer IDs that is populated by an orchestration process that automatically retrieves and returns customer-related data. In addition, a periodic event (e.g., every 20 minutes) is defined in the mashup that is triggered by changes in the output of date-time widget 502.

In operation at the mashup run-time (as illustrated in the run-time preview in FIG. 5), the orchestration process populates the list variable with customer IDs (e.g., DELL INC. and CISCO SYSTEM, INC.) and the list variable is passed to financial performance widget 504, which displays the content of the list variable to the user. In response to a user selection of a customer (e.g., a click on the customer ID of DELL INC. in financial performance widget 504), the selected customer ID is passed as input to financial performance widget 504. In addition, the datetime mashup variable that is assigned the current output from date-time widget 502 is also passed as input to financial performance widget 504. As a result responsive to the provided input, financial performance widget 504 returns a graph indicating various financial data for DELL Inc. based on the current date and time. When the periodic event is triggered by the output of date-time widget 502, the current output date and time values returned from date-time widget 502 are passed to financial performance widget 504. As a result, financial performance widget 504 is invoked with the new date and time values, and the output graph returned by financial performance widget 504 is refreshed.

Figure 6:
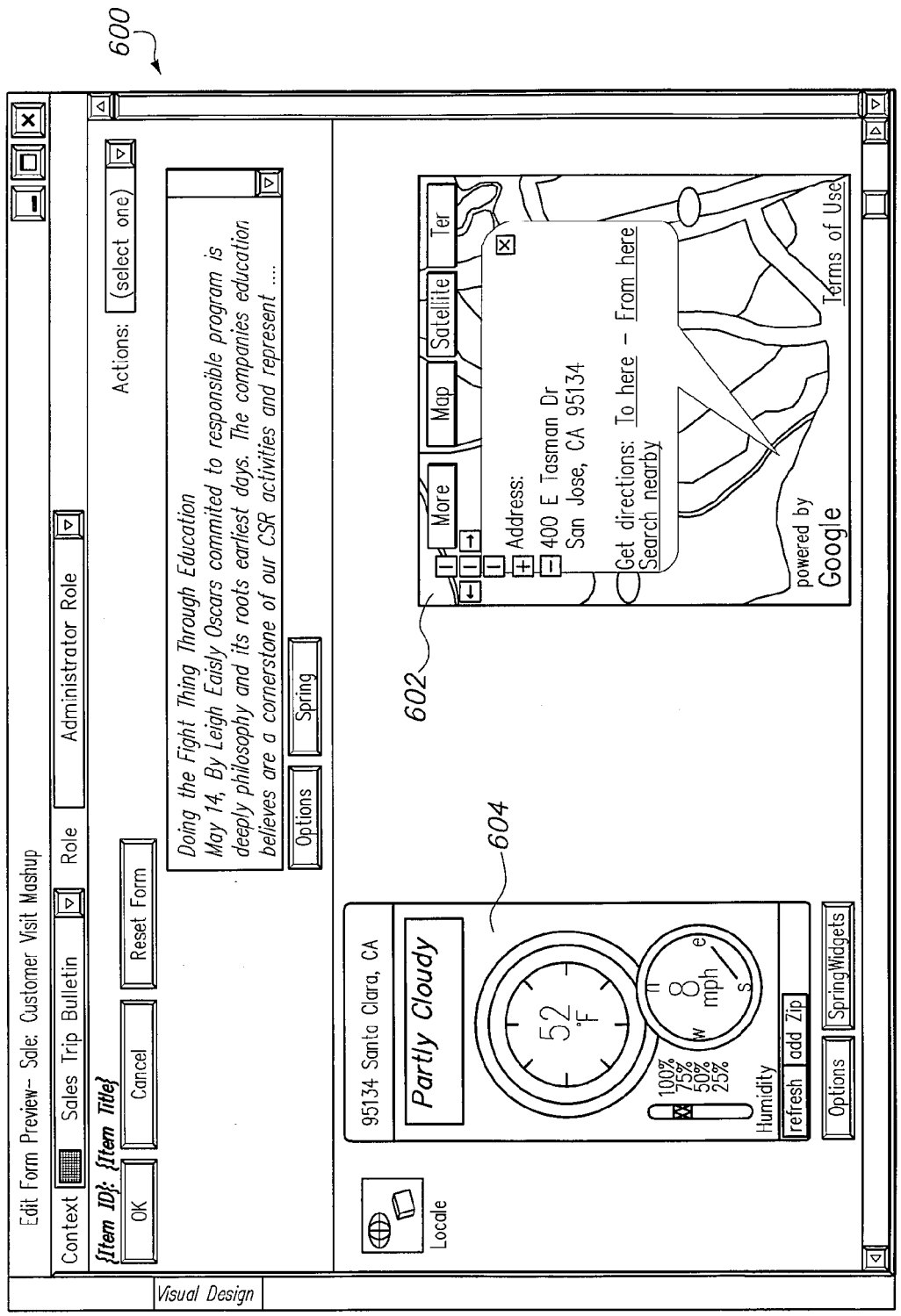
FIG. 6 is a block diagram that illustrates an example mashup design application operable to present a run-time preview of widgets bound in a mashup according to an example embodiment.

FIG. 6 is a block diagram that illustrates an example mashup design application that is operable to present a run-time preview of widgets that are bound in a mashup through their input parameters. Mashup design application 600 provides a run-time preview of a mashup that includes map widget 602 provided by Google Gadgets and weather widget 604 provided by SpringWidgets. The mashup run-time preview is performed by executing at least a portion of mashup code that references widgets 602 and 604, and is thus identical in operation and functionality as the run-time rendering of the mashup. In accordance with the techniques described herein, both map widget 602 and weather widget 604 are bound to a mashup variable storing locale information (e.g., an address) that may be provided in the mashup as output from another widget or may be directly entered by a user at the mashup run-time. When the mashup is rendered at run-time (as illustrated in the run-time preview in FIG. 6), the value of the locale mashup variable is passed as input to both map widget 602 and weather widget 604. As a result, map widget 602 returns a map of the locale (e.g., address) identified by the value of the locale mashup variable, and weather widget 604 returns current weather data for the identified locale.

Figure 7:
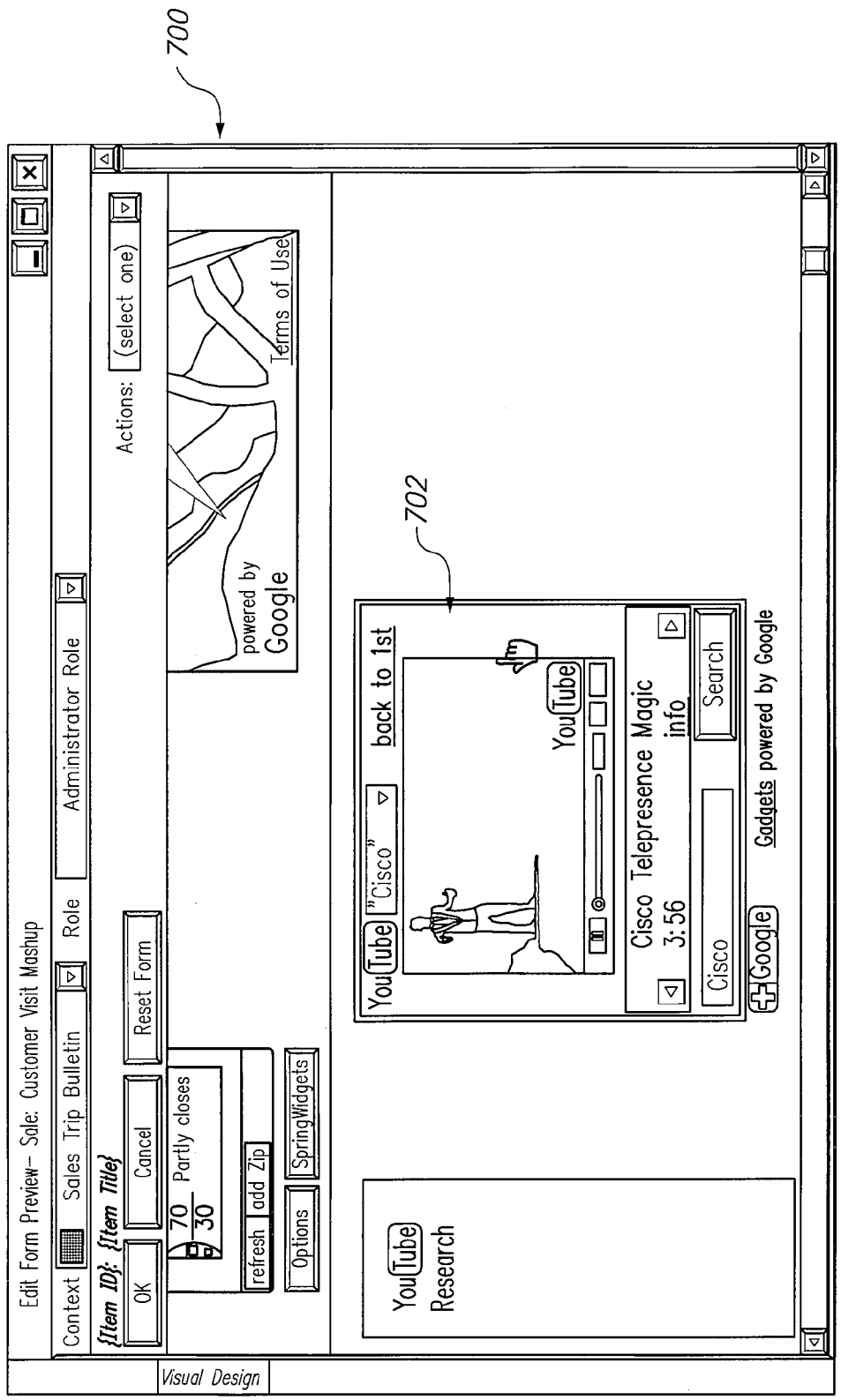
FIG. 7 is a block diagram that illustrates an example mashup design application operable to present a run-time preview of a widget bound in a mashup according to an example embodiment.

FIG. 7 is a block diagram that illustrates an example mashup design application that is operable to present a run-time preview of a widget that is bound in a mashup through a substitutable parameter. Mashup design application 700 provides a run-time preview of a mashup that includes YouTube widget 702 that provided by Google Gadgets and that is operable to play a video selected by the end user of the mashup. The mashup run-time preview is performed by executing at least a portion of mashup code that references widget 702, and is thus identical in operation and functionality as the run-time rendering of the mashup. In accordance with the techniques described herein, YouTube widget 702 is automatically bound by determining a URL link to a YouTube video, and then binding the link to a content variable of the mashup. At design-time, mashup design application 700 automatically generates and wraps around the link all code that is necessary for generating and assigning different URL links to the content variable in response to user selection of different videos, for invoking the URL links through the content variable, and for playing the videos indicated in the links for the end user of the mashup at run-time. In this manner, the techniques described herein allow for binding a substitutable parameter of a widget (e.g., URL links to YouTube videos) to a mashup variable that at run-time can be assigned values that are generated by mashup code that is generated automatically at design-time.

X. Implementation Mechanisms

Depending upon a particular implementation, the techniques described herein may be implemented in any context and on computing devices of various computing platforms or architectures, and are not limited to any particular context, computing platform, or architecture. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hardwired and/or program logic to implement the techniques.

Figure 8:
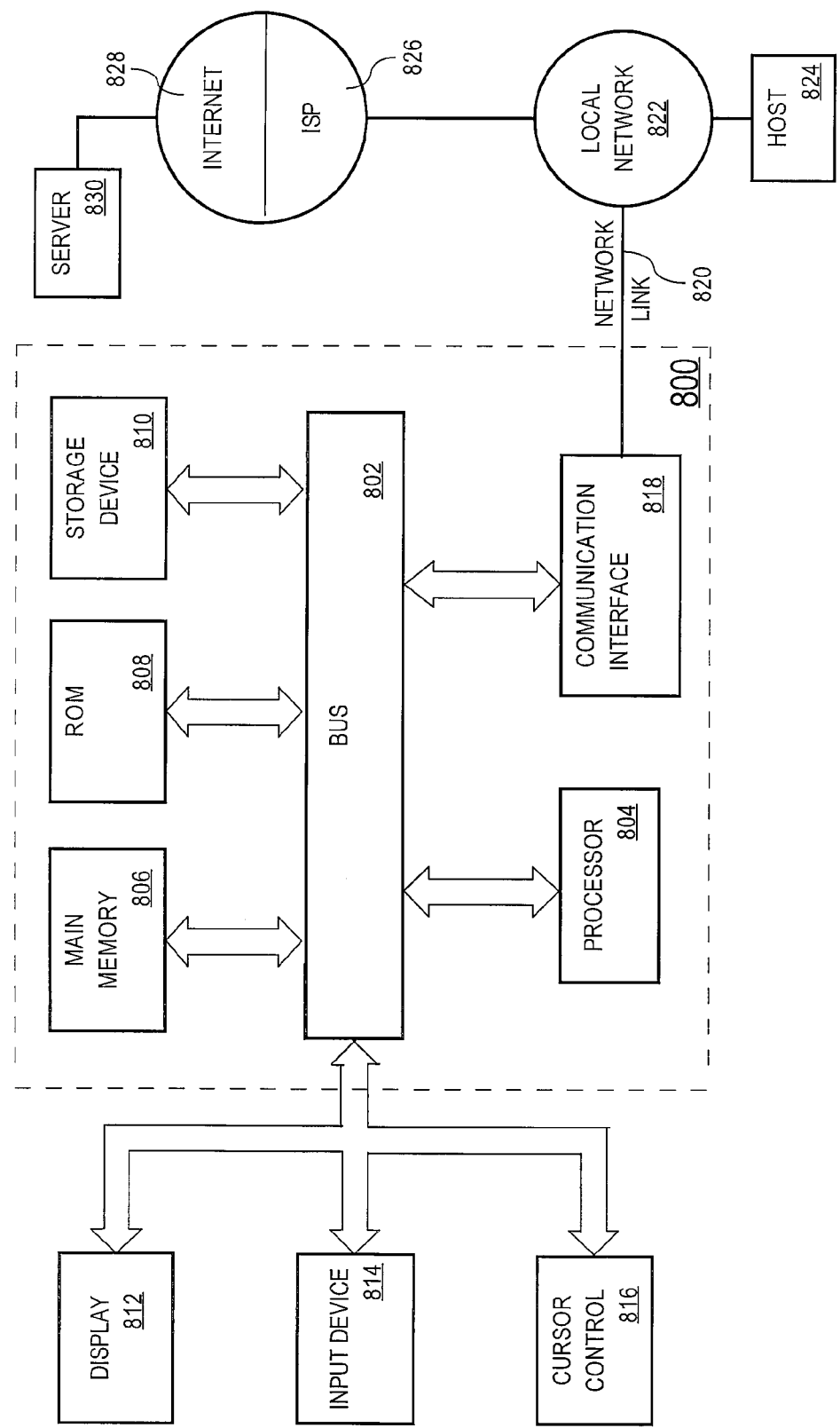
FIG. 8 is a block diagram that illustrates an example computer system on which embodiments may be implemented.

For purposes of explanation, FIG. 8 is a block diagram that illustrates an example computer system 800 upon which embodiments of the techniques described herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the techniques described herein are not limited to any specific combination of hardware circuitry and software.

The term "computer-readable medium" as used herein refers to any medium that participates in providing data that causes a computing device to operate in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, for example, a floppy disk, a flexible disk, hard disk, magnetic tape, or any other magnetic medium, a CD-ROM, any other optical medium, a RAM, a PROM, an EPROM, a FLASH-EPROM, any other memory chip or memory cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium for designing a mashup, the non-transitory computer-readable storage medium storing instructions which, when executed by one or more processors, cause the performance of:
    prior to run-time:
        receiving first user input that relates a first Graphical User Interface (GUI) object, that represents a first widget, to a second GUI object that represents a second widget;
        wherein the first widget and the second widget are to be included in the mashup;
        wherein the first widget conforms to a first widget specification and the second widget conforms to a second widget specification that is different than the first widget specification;
        in response to receiving the first user input:
            defining a first variable in the mashup based on the first user input, wherein the first variable is configured to store a first variable value at run-time, and wherein, at run-time, the first variable value of the first variable will be replaced by a value of an output parameter of the first widget and the first variable value of the first variable will be used as an input parameter of the second widget;
            based on the first user input, generating an event definition that defines an event which, when detected at run-time, causes contents of at least one of the first widget and the second widget to be refreshed;
            storing a binding definition that associates the event definition of the event, the first variable, the output parameter of the first widget, and the input parameter of the second widget; and
            generating a definition of the mashup, wherein generating the definition of the mashup comprises including the binding definition in the definition of the mashup;
    at run-time:
        receiving second user input comprising a data value;
        in response to receiving the second user input, replacing the data value to the first variable value of the first variable, using the first variable value as the input parameter to the second widget to refresh contents of the second widget.

2. The non-transitory computer-readable storage medium of claim 1, wherein:
    the first widget specification includes a first standard that governs properties of the first widget; and
    the second widget specification includes a second standard, different than the first standard, that governs the properties of the second widget.

3. The non-transitory computer-readable storage medium of claim 1, wherein the instructions that cause the performance of defining the first variable further comprise instructions which, when executed by the one or more processors, cause the performance of: determining a data type of the first variable based on the first user input.

4. The non-transitory computer-readable storage medium of claim 1, wherein the instructions that cause the performance of defining the first variable further comprise instructions which, when executed by the one or more processors, cause the performance of:
    determining a data type of the first variable based on the first user input; and
    selecting the first variable from a list of variables based on the data type.

5. The non-transitory computer-readable storage medium of claim 1, further comprising instructions which, when executed by the one or more processors, cause the performance of:
    in response to the first user input, defining a second variable in the mashup based on the first user input, wherein, at run-time, a value of an output parameter of the second widget is assigned to the second variable.

6. The non-transitory computer-readable storage medium of claim 1, further comprising instructions which, when executed by the one or more processors, cause the performance of:
    in response to the first user input, defining a second variable in the mashup based on the first user input, wherein, at run-time, data included in the mashup is assigned to the second variable and the second variable is used as an input parameter of the first widget;
    wherein the data is received at run-time in response to an interaction of a user with the mashup.

7. The non-transitory computer-readable storage medium of claim 1, further comprising instructions which, when executed by the one or more processors, cause the performance of:
    in response to the first user input, defining a second variable in the mashup based on the first user input, wherein, at run-time, data included in the mashup is assigned to the second variable and the second variable is used as an input parameter of the first widget;
    wherein the data is received at run-time from one of a human workflow and an orchestration process that are included in the mashup.

8. The non-transitory computer-readable storage medium of claim 1, further comprising instructions which, when executed by the one or more processors, cause the performance of:
    in response to the first user input, defining a second variable in the mashup based on the first user input, wherein, at run-time, data returned as an output parameter of the second widget is assigned to the second variable; and
    the second variable is used as input to one of a human workflow and an orchestration process that are included in the mashup.

9. The non-transitory computer-readable storage medium of claim 1, further comprising instructions which, when executed by the one or more processors, cause the performance of:
    inspecting a first contract associated with the first widget to determine a set of events that can cause the contents of the first widget to be refreshed;
    displaying the set of events to a user that is designing the mashup;

in response to the first user input, determining from the first user input that the user has selected the event from the set of events;

wherein the event, when detected at run-time, causes the contents of the first widget to be refreshed.

10. The non-transitory computer-readable storage medium of claim 1, further comprising instructions which, when executed by the one or more processors, cause the performance of:

causing a set of pre-defined events to be displayed to a user that is designing the mashup; and in response to the first user input, determining from the first user input that the user has selected the event from the set of pre-defined events.

11. The non-transitory computer-readable storage medium of claim 10, wherein the set of pre-defined events includes one or more external events that are generated at run-time by entities that are outside the mashup, wherein the event is an external event of the one or more external events.

12. The non-transitory computer-readable storage medium of claim 10, wherein the set of pre-defined events includes one or more mashup events that are generated at run-time by one or more of a human workflow and an orchestration process within the mashup, wherein the event is a mashup event of the one or more mashup events.

13. The non-transitory computer-readable storage medium of claim 1, wherein:

the event, when detected at run-time, triggers an action; and wherein the non-transitory computer-readable storage medium further comprises instructions which, when executed by the one or more processors, cause the performance of: in response to detecting the event at run-time, the mashup dynamically determines the action at least in part by locating the event in the binding definition.

14. The non-transitory computer-readable storage medium of claim 1, further comprising instructions which, when executed by the one or more processors, cause the performance of one or more of:

discovering a first contract for the first widget, wherein discovering the first contract comprises:

accessing a first widget repository to retrieve the first contract and to determine a type of the first widget specification;

based on the type of the first widget specification, selecting a first adapter from a plurality of discovery adapters; and invoking the first adapter to determine properties of the first widget from the first contract;

discovering a second contract for the second widget, wherein discovering the second contract comprises:

accessing a second widget repository to retrieve the second contract and to determine the type of the second widget specification;

based on the type of the second widget specification, selecting a second adapter from the plurality of discovery adapters; and invoking the second adapter to determine the properties of the second widget from the second contract.

15. The non-transitory computer-readable storage medium of claim 1, further comprising instructions which, when executed by the one or more processors, cause the performance of one or more of:

in response to the first user input, accessing a first contract for the first widget to determine the output parameter of the first widget; and in response to the first user input, accessing a second contract for the second widget to determine the input parameter of the second widget.

16. The non-transitory computer-readable storage medium of claim 1, further comprising instructions which, when executed by the one or more processors, cause the performance of one or more of:

displaying, to a user that is designing the mashup, the output parameter of the first widget in association with the first GUI object that represents the first widget; and displaying, to the user, the input parameter of the second widget in association with the second GUI object that represents the second widget.

17. The non-transitory computer-readable storage medium of claim 1, further comprising instructions which, when executed by the one or more processors, cause the performance of:

based on one or more of a first contract for the first widget and a second contract for the second widget, generating one or more configuration GUIs that allow a user, who is designing the mashup, to configure properties of at least one of the first widget and the second widget;

displaying the one or more configuration GUIs to the user; and receiving the first user input through the one or more configuration GUIs.

18. The non-transitory computer-readable storage medium of claim 1, wherein the definition of the mashup conforms to an eXtensible Markup Language (XML) format.

19. A computer implemented method for designing a mashup, comprising:

prior to run-time:

receiving first user input that relates a first Graphical User Interface (GUI) object, that represents a first widget, to a second GUI object that represents a second widget;

wherein the first widget and the second widget are to be included in the mashup;

wherein the first widget conforms to a first widget specification and the second widget conforms to a second widget specification that is different than the first widget specification;

in response to receiving the first user input:

defining a first variable in the mashup based on the first user input, wherein the first variable is configured to store a first variable value at run-time, and wherein, at run-time, the first variable value of the first variable will be replaced by a value of an output parameter of the first widget and the first variable value of the first variable will be used as an input parameter of the second widget;

based on the first user input, generating an event definition that defines an event which, when detected at run-time, causes contents of at least one of the first widget and the second widget to be refreshed;

storing a binding definition that associates the event definition of the event, the first variable, the output parameter of the first widget, and the input parameter of the second widget; and generating a definition of the mashup, wherein generating the definition of the mashup comprises including the binding definition in the definition of the mashup;

at run-time:

receiving second user input comprising a data value;

in response to receiving the second user input, replacing the data value to the first variable value of the first variable, using the first variable value as the input parameter to the second widget to refresh contents of the second widget.

20. An apparatus for designing a mashup, the apparatus comprising a volatile of non-volatile medium storing instructions which, when executed by one or more processors, cause the one or more processors to perform steps comprising:

prior to run-time:
  receiving first user input that relates a first Graphical User Interface (GUI) object, that represents a first widget, to a second GUI object that represents a second widget;
  wherein the first widget and the second widget are to be included in the mashup;
  wherein the first widget conforms to a first widget specification and the second widget conforms to a second widget specification that is different than the first widget specification;
  in response to receiving the first user input:
    defining a first variable in the mashup based on the first user input, wherein the first variable is configured to store a first variable value at run-time, and wherein, at run-time, the first variable value of the first variable will be replaced by a value of an output parameter of the first widget and the first variable value of the first variable will be used as an input parameter of the second widget;
    based on the first user input, generating an event definition that defines an event which, when detected at run-time, causes contents of at least one of the first widget and the second widget to be refreshed;
    storing a binding definition that associates the event definition of the event, the first variable, the output parameter of the first widget, and the input parameter of the second widget; and
    generating a definition of the mashup, wherein generating the definition of the mashup comprises including the binding definition in the definition of the mashup;

at run-time:
  receiving second user input comprising a data value;
  in response to receiving the second user input, replacing the data value to the first variable value of the first variable, using the first variable value as the input parameter to the second widget to refresh contents of the second widget.

* * * * *